US011148671B2

(12) United States Patent
Welch et al.

(10) Patent No.: US 11,148,671 B2
(45) Date of Patent: Oct. 19, 2021

(54) AUTONOMOUS SYSTEMS HUMAN CONTROLLER SIMULATION

(71) Applicant: UNIVERSITY OF CENTRAL FLORIDA RESEARCH FOUNDATION, INC., Orlando, FL (US)

(72) Inventors: Gregory Welch, Orlando, FL (US); Gerd Bruder, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 17/014,486

(22) Filed: Sep. 8, 2020

(65) Prior Publication Data

US 2021/0070307 A1    Mar. 11, 2021

Related U.S. Application Data

(60) Provisional application No. 62/896,875, filed on Sep. 6, 2019.

(51) Int. Cl.
*B60W 40/08* (2012.01)
*B60W 50/00* (2006.01)
(Continued)

(52) U.S. Cl.
CPC ............. *B60W 40/08* (2013.01); *B60K 35/00* (2013.01); *B60W 50/0098* (2013.01);
(Continued)

(58) Field of Classification Search
CPC ... B60W 40/08; B60W 50/0098; B60K 35/00; B60K 2370/1529; B60K 2370/165;
(Continued)

(56) References Cited

U.S. PATENT DOCUMENTS 8,645,029 B2    2/2014  Kim et al.
2017/0345292 A1*  11/2017  Haran .................... G08G 1/005
(Continued)

FOREIGN PATENT DOCUMENTS

DE    102012015002 B4 *  9/2016  ........... B62D 15/028

OTHER PUBLICATIONS

Nissan, Nissan Unveils Invisible-to-Visible Technology Concept at CES, Jan. 4, 2019 (Year: 2019).*
(Continued)

*Primary Examiner* — Mahmoud S Ismail
*Assistant Examiner* — Gabriel Anfinrud
(74) *Attorney, Agent, or Firm* — Anton J. Hopen; Smith & Hopen, P. A.

(57) ABSTRACT

Dynamic online and real-time virtual humans exhibit behaviors associated with inputs and outputs of an autonomous control system. To foster the awareness and trust, the virtual humans exhibit situational awareness via apparent (e.g., rendered) behaviors based on inputs such as direct system measures, functions of the measures, estimates of state based on measures, and estimates of state based on a priori constraints. The virtual humans also exhibit situational control via apparent behaviors associated with outputs such as direct control of devices, functions of control, actions based on high-level goals, and the optional use of virtual versions of conventional physical controls. A dynamic virtual human who continually exhibits awareness of the system state and relevant contextual circumstances, along with the ability to directly control the system, is used to reduce negative feelings associated with the system such as uncertainty, concern, stress, or anxiety on the part of real humans.

13 Claims, 24 Drawing Sheets

(51) Int. Cl.
  *G06F 3/01* (2006.01)
  *G06T 13/40* (2011.01)
  *B60K 35/00* (2006.01)
  *G02B 27/01* (2006.01)
(52) U.S. Cl.
  CPC .......... *G02B 27/0172* (2013.01); *G06F 3/011* (2013.01); *G06F 3/017* (2013.01); *G06T 13/40* (2013.01); *B60K 2370/1529* (2019.05); *B60K 2370/165* (2019.05); *B60K 2370/175* (2019.05); *B60K 2370/785* (2019.05)
(58) Field of Classification Search
  CPC ........ B60K 2370/175; B60K 2370/785; G02B 27/0172; G06F 3/011; G06F 3/017; G06T 13/40
  See application file for complete search history.

(56) References Cited

U.S. PATENT DOCUMENTS

| | | | | |
|---|---|---|---|---|
| 2018/0173237 | A1* | 6/2018 | Reiley | G05D 1/0061 |
| 2019/0095775 | A1* | 3/2019 | Lembersky | G06N 3/008 |
| 2019/0171008 | A1* | 6/2019 | Koren | G03B 21/60 |
| 2020/0001173 | A1* | 1/2020 | Jung | G06T 19/006 |
| 2020/0047668 | A1* | 2/2020 | Ueno | B60W 50/14 |
| 2020/0079215 | A1* | 3/2020 | Thurimella | G10L 15/22 |
| 2020/0110560 | A1* | 4/2020 | Hariton | G06F 3/011 |
| 2020/0175739 | A1* | 6/2020 | Meister | H04M 1/72544 |
| 2020/0327860 | A1* | 10/2020 | Chen | G06F 3/147 |
| 2020/0381488 | A1* | 12/2020 | Lesonen | H01L 27/3237 |

OTHER PUBLICATIONS

Machine Translation of DE102012015002B4, attached to original (Year: 2016).*
Haeuslschmid et al., Supporting Trust in Autonomous Driving, Proceedings of the 22nd International Conference on Intelligent User Interfaces, Mar. 13-16, 2017, pp. 1-11. (Year: 2017).*
Niu D, Terken J, Eggen B. Anthropomorphizing information to enhance trust in autonomous vehicles. Hum Factors Man. 1-8. https://doi.org/10.1002/hfm.20745 (Year: 2017).*
Hoffman et al., Development of Speech-Based In-Car HMI Concepts for Information Exchange Internet Apps, Natural Interaction with Robots, Knowbots and Smartphones: Putting Spoken Dialog Systems into Practice, DOI 10.1007/978-1-4614-8280-2 2, © Springer Science+Business Media, New York 2014, pp. 15-28.
Waytz et al., The mind in the machine: Anthropomorphism increases trust in an autonomous vehicle, Journal of Experimental Social Psychology, vol. 52, 2014, pp. 113-117.
Haeuslschmid et al., Supporting Trust in Autonomous Driving, Proceedings of the 22nd International Conference on Intelligent User Interfaces, Mar. 13-16, 2017, pp. 1-11.
Haesler et al., Seeing is Believing: Improving the Perceived Trust in Visually Embodied Alexa in Augmented Reality, Proceedings of the 17th IEEE International Symposium on Mixed and Augmented Reality (ISMAR 2018), Munich, Germany, Oct. 16-20, 2018, pp. 1-2.
Kim et al., Does a Digital Assistant Need a Body? The Influence of Visual Embodiment and Social Behavior on the Perception of Intelligent Virtual Agents in AR, Proceedings of the 17th IEEE International Symposium on Mixed and Augmented Reality (ISMAR 2018), Munich, Germany, Oct. 16-20, 2018, pp. 1-10.

* cited by examiner

AUTONOMOUS SYSTEMS HUMAN CONTROLLER SIMULATION

CROSS-REFERENCE TO RELATED APPLICATIONS

This application is a continuation of and claims priority to U.S. Provisional Patent Application No. 62/896,875, entitled "Autonomous Systems Human Controller Simulation", filed on Sep. 6, 2019, the contents of which are herein incorporated by reference.

GOVERNMENTAL SUPPORT

This invention was made with Government support under Grant No. 1800961, awarded by the National Science Foundation. The Government has certain rights in the invention.

BACKGROUND OF THE INVENTION

1. Field of the Invention

This invention relates to the use of computer simulations to display an anthropomorphic virtual human for trust-sensitive autonomous or semi-autonomous systems wherein the virtual human exhibits the reactive and directive behavior consistent with a situationally aware, competent controller of the system in real-time.

2. Brief Description of the Related Art

Most electro-mechanical, computerized, or otherwise automated systems appear as "black boxes" to humans. This is increasingly true, for example, as more and more such systems are increasingly acting autonomously on behalf of the human users, employing some form of a control system and/or artificial intelligence (AI) system that uses inputs such as measurements from sensors (or estimates of state derived from the measurements, or a priori constraints, etc.) and acts on those measures/estimates automatically (without human intervention) via outputs to achieve the desired system behavior. For example, in the case of an autonomous vehicle such as a car (or truck or boat, etc.), the system might use cameras, radar or other "depth" sensors, microphones, inertial components, radio transmitters, and receivers, etc. to help the autonomous vehicle make decisions about controlling the vehicle. These decisions are then operationalized by actuating various electro-mechanical components to control the vehicle. Similarly, a computer program configured to make autonomous stock purchases will likely take into account many measures (e.g., market trends, company news, other stock prices), and then make and operationalize autonomous buy/sell decisions.

Ironically while the autonomy of sensing and behavior in such systems is exactly what we want, the paradigm requires a great deal of trust on the part of real humans. In particular, real humans must trust that the systems are aware of all of the important factors (e.g., measures, system state, relevant environmental circumstances), that the systems will make "good" decisions based on those factors, and that the systems will reliably act on those "good" decisions.

For some systems or circumstances, a system failure will have relatively minor consequences beyond inconvenience or discomfort. Such is the case, for example, for a home heating and air conditioning system for most of us. In such cases, the negative consequences associated with a betrayal of trust (a system failure) are relatively minor, and humans generally do not experience anxiety related to whether such systems can be trusted. In these circumstances, the humans relying on the system generally do not even think about it until such the system malfunctions.

However, for other systems, e.g., an autonomous vehicle driving at high speeds on a highway, the negative consequences associated with a betrayal of trust (a system failure) are very high—lives are at stake, and the risk is continuously apparent to the human occupants of the vehicle. Humans who are used to directly controlling such systems can feel an increased level of fear or anxiety when they give up control to an autonomous system. In such situations, the problem is that the "black box" nature of these systems often hide (do not expose) the system's "awareness" of the relevant conditions (e.g., from sensor measurements, estimates, a priori constraints, etc.). Any autonomous control operationalized on behalf of the human (e.g., turning a steering wheel or depress the brake pedal) is not apparent to the human until after the controls take effect and result in a detectible change by the human. The result of this is an increasing sense of helplessness, fear, or anxiety about the autonomous control of the system. This is true for all sorts of systems, including, for example, autonomous vehicles, where the autonomous actions will have direct physical consequences, autonomous stock management (buy-sell) systems, where the autonomous actions will have direct financial consequences, and autonomous medical diagnosis/decision systems, where the autonomous actions will have direct health and wellbeing consequences. This is also true for autonomous systems where the consequences are indirect, as the effects are generally less visible, even in retrospect.

Prior Solutions

The conventional approach to providing awareness of autonomous system actions is to provide direct indications through words or symbology of quantitative information, including the system state, environmental conditions, or other considerations. For example, an autonomous automobile will use electronic (hardware or software) gauges, alert indicators (symbols or words), or diagrams such as a bird's eye view of the automobile and the surrounding vehicles. In such systems, dangerous conditions such as the presence of other vehicles that are too close (front, back, sides), will be brought to the driver's attention via flashing alerts in the dashboard or center console area, visible indicator lights on the side mirrors, etc. Even for automotive systems that are not fully autonomous, autonomous systems can provide indicators of danger, e.g., a buzzing and a flashing indicator if a drivers starts to stray or drift out of their current traffic lane without signaling. Software systems, e.g., for stock management or healthcare diagnosis, might provide charts, numbers, a list of conditions, and other quantitative information that affected the autonomous outcome.

In U.S. Pat. No. 8,645,029 to Y S Kim, J K Shin, and K W Jeon (2014), the inventors use a virtual avatar to represent the physical size and shape of the driver for ergonomic purposes. Specifically, an avatar is created for each driver to assist with the automatic ergonomic adjustments of components such as mirrors and seats, either initially when a driver first uses the vehicle, or later to recall the prior settings.

In "Development of Speech-Based In-Car HMI Concepts for Information Exchange Internet Apps" by Hansjörg Hofmann, Anna Silberstein, Ute Ehrlich, André Berton, Christian Müller, and Angela Mahr (in J. Mariani et al. (eds.), Natural Interaction with Robots, Knowbots and Smartphones: Putting Spoken Dialog Systems into Practice, DOI 10.1007/978-1-4614-8280-2 2, © Springer Science+Business Media New York 2014), the authors teach the general use of an avatar for human-machine interaction (HMI).

For example, Hofmann et al. teach the use of an avatar appearing in a 2D dashboard or console display to "raise the naturalness" of the HMI. In particular, Hofmann et al. teach that the avatar can be made to appear when speech dialog is initiated, and then disappear when the dialog is complete. They teach that the avatar can gesture to other graphical elements on the same 2D screen in a way that conveys "human character." They teach, "[f]or example, when the system asks for inputting the destination, the avatar points at the destination widget on the screen. When the user browses the hotel result list, the avatar makes a swipe gesture to support the scrolling in the list."

In "The mind in the machine: Anthropomorphism increases trust in an autonomous vehicle" by Adam Waytz, Joy Heafner, and Nicholas Epley (Journal of Experimental Social Psychology, Volume 52, 2014, Pages 113-117, ISSN 0022-1031, https://doi.org/10.1016/j.jesp.2014.01.005) the authors carried out experiments to examine the extent to which a nonhuman agent such as an autonomous vehicle is "anthropomorphized with a humanlike mind." The authors found that study participants trusted that the vehicle would "perform more competently" as it acquired more anthropomorphic features, e.g., the vehicle was referred to by name, was given a gender, and was given a voice.

In "Supporting Trust in Autonomous Driving" by Renate Häuslschmid, Max von Bülow, Bastian Pfleging, and Andreas Butz (Proceedings of the 22nd International Conference on Intelligent User Interfaces, Mar. 13-16, 2017, Limassol, Cyprus, DOI 10.1145/3025171.3025198), the authors carried out an experiment using a "chauffeur avatar" that appeared in a simulated heads-up display in a simulated autonomous car. The avatar was rendered in a "comic style" and was designed to react to environmental events "in order to convey competence and thereby foster trust." While the authors did investigate the notion of trust being afforded by an avatar visible to the driver, the avatar behavior was not derived from the online measurements, estimates, a priori constraints, etc. employed by the autonomous system, nor was it designed to give the appearance of direct online control of the vehicle. In fact, there was no disclosure of any method for creating avatar behavior.

In the inventors' prior work (Steffen Haesler, Kangsoo Kim, Gerd Bruder, and Gregory F. Welch, "Seeing is Believing: Improving the Perceived Trust in Visually Embodied Alexa in Augmented Reality," Proceedings of the 17th IEEE International Symposium on Mixed and Augmented Reality (ISMAR 2018), Munich, Germany, Oct. 16-20, 2018, 2018; and Kangsoo Kim, Luke Boelling, Steffen Haesler, Jeremy N. Bailenson, Gerd Bruder, and Gregory F. Welch, "Does a Digital Assistant Need a Body? The Influence of Visual Embodiment and Social Behavior on the Perception of Intelligent Virtual Agents in AR," Proceedings of the 17th IEEE International Symposium on Mixed and Augmented Reality (ISMAR 2018), Munich, Germany, Oct. 16-20, 2018, 2018) the inventors demonstrated that individuals who witness an AR embodiment of a voice-only autonomous agent ("Alexa" of the Amazon Echo system) carrying out actions such as turning on a light or granting privacy—actions actually carried out autonomously, experienced an increased sense of presence, trust, etc. when the autonomous actions were reinforced with visual representations of the avatar carrying out the actions.

BRIEF SUMMARY OF THE INVENTION

The present invention includes a method of reducing a human's anxiety in a trust-sensitive autonomous control system. This includes displaying an anthropomorphic virtual human to the human wherein the virtual human exhibits behavior consistent with a situationally aware, competent operator of the control system in real-time while the control system is in operation. The anxiety of the human stems from at least two aspects: (1) the failure of the autonomous system has significant consequences to the human; and (2) the autonomous system's complexity is considered a "black box" to the human. In other words, the operational features, controls, and inputs normally within the control of the human are obfuscated by necessity or design. Autonomous systems subject to the benefits of this invention include, but are not limited to, financial transactions, medical diagnosis, medical treatment, vehicle navigation, and machinery operation.

In an embodiment of the invention, a computing device is provided having a processor that generates a visual output of a computer-simulated environment. The output is viewable through a display device. The display device may be a two-dimensional graphics monitor, a head-mounted augmented reality display, a heads-up display projected onto a substantially transparent window (typically a windshield), a video projector, a retinal scan display or the like. The computing device includes a computer processor accessing non-transitory computer-readable memory. The memory stores computer-readable instructions that are executed by the processor. Trust-sensitive autonomous systems inherently receive input (typically through sensors or data feeds) and then output instructions to control objects and/or execute functions. In this embodiment, one or more sensors are communicatively coupled to the processor. Situational data is used by the trust-sensitive autonomous control system to make real-world automation decisions.

The computer-simulated environment is rendered through the display device showing at least a portion of the situational data. In the case of an autonomous vehicle application, situational data may include the spatial location and direction of nearby vehicles, pedestrians, or fixed objects impacting the safe travel of an existent vehicle (e.g., a real-world vehicle). In the case of an automated financial application, situational data may be security values, trends, or other data used by the autonomous system to make a real-world decision (e.g., a binding, financial transaction). In yet another example, in the medical field, situational data may include the vital signs of a patient being monitored in a hospital.

A present, inventive concept draws on the psychological trust attributed to visual representations of the human form. Accordingly, within the computer-simulated environment, a virtual human is generated. The virtual human is reactive to the situational data in synchronization with the autonomous control system. For example, the virtual human conveys ongoing, attentive, and competent observation of the data and/or objects rendered in the computer-simulated environment. When the autonomous system takes action in a real-world control event, the virtual human mirrors the manual operation of an analogous, non-autonomous variant.

For example, consider an autonomous vehicle that slows down and makes a right turn. The virtual human would move her limbs in synchronization with the turning on of a right-turn blinker as the autonomous control system turns on the real-life, existent vehicle's blinker before the turn. The virtual human further turns her head right, appearing to visually scan the area prior to the turn. The virtual human then moves her rendered foot from the accelerator pedal location to the brake pedal location as the autonomous control system operates the existent vehicle to slow the vehicle. As the autonomous control system turns the wheels to the existent vehicle, the virtual human makes the motions of turning a steering wheel.

Embodiments of the invention may further render, in conjunction with the virtual human, virtual controls of the autonomous vehicle. For example, a purely autonomous vehicle with no manual operation option lacks a steering wheel for the existent human occupant. However, according to an embodiment of the invention, a "virtual" steering wheel is rendered along with the virtual human, so the rendered operation is conveyed in a context easier for the existent human occupation to absorb cognitively. In contradistinction, for a vehicle with manual controls, a virtual human may be spatially rendered to appear to operate the manual controls as the autonomous operation engages them.

A variant of the invention divides situational data received by the computer processor into two parameter sets. A first set is deemed an observant set. An observant set of parameters are those that maintain a substantially continuous state of autonomous operation. For example, an autonomous vehicle driving down a highway and simply staying within the lanes. There is clearly continuous automation invoked responsive to possibly visual, radar, sonar, and other sensor data to maintain a proper course. In the case of observant set parameters, the autonomous control system makes no significant changes in operation correlating to trust decisions such as changing lanes, taking an exit ramp, or passing another vehicle. While the situational data received meets the parameters for the observant set, the virtual human is not rendered as a frozen image. Rather, the virtual human expresses relatively small motions consistent with attentive and spatially aware operation. For example, for autonomous driving, the virtual human "holds" a presumed or rendered steering wheel making minor corrections consistent with the operation of the actual vehicle. The virtual human further scans the roadway with her had as a competent and attentive driver maintains a visual understanding of the surroundings.

As opposed to the observant set of parameters, a second set of parameters denoted as "engagement" causes the computer processor to graphically render through the display device the virtual human expressing engagement gestures synchronized in real-time with the actions taken by the autonomous control system. Attentive and engagement gestures include, but are not necessarily limited to, renderings of the virtual human's head orientation, pupil orientation, limb orientation, and facial expression.

An engagement set of parameters detected in the situational data are those that transition the autonomous from a steady-state operation to that of decision-making and action that challenges the psychological trust an existent human has for their own safety and/or relinquishment of control to the autonomous system. As enumerated above, engagement set parameters to invoke a clear change in operation by the existent human. This includes turning a vehicle onto a different road, starting or stopping machinery, executing a stock trade, administering medication through an intravenous (IV) drip, or the like. A rendered virtual human turns a steering wheel, depresses a start or stop button, selects a "stock buy" option on an interface, and injects medicine through a syringe into an IV port, respectively.

Some embodiments of the invention relating to autonomous vehicles render the virtual human as a driver or passenger of the existent vehicle. Alternatively, the virtual human may be rendered as a non-occupant of the existent vehicle. This may be particularly useful when parking a vehicle as the virtual human appears to direct the vehicle into a parking spot. It is anticipated this "externally rendered" virtual human is useful for both automated parking as well as manually performed parking.

Additionally, the virtual human attending to and/or operating the existent vehicle may be observable by more than the occupants of the vehicle. For example, a pedestrian wearing an augmented reality headset communicatively coupled to the autonomously controlled vehicle may see a rendered virtual human operating the existent vehicle without any existent human occupants.

Alternatively, embodiments of the invention may use heads-up projection displays, transparent glass displays, or integral vehicle panel displays to convey the virtual human "operator" without the need for wireless, computer-based communication to a non-occupant.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
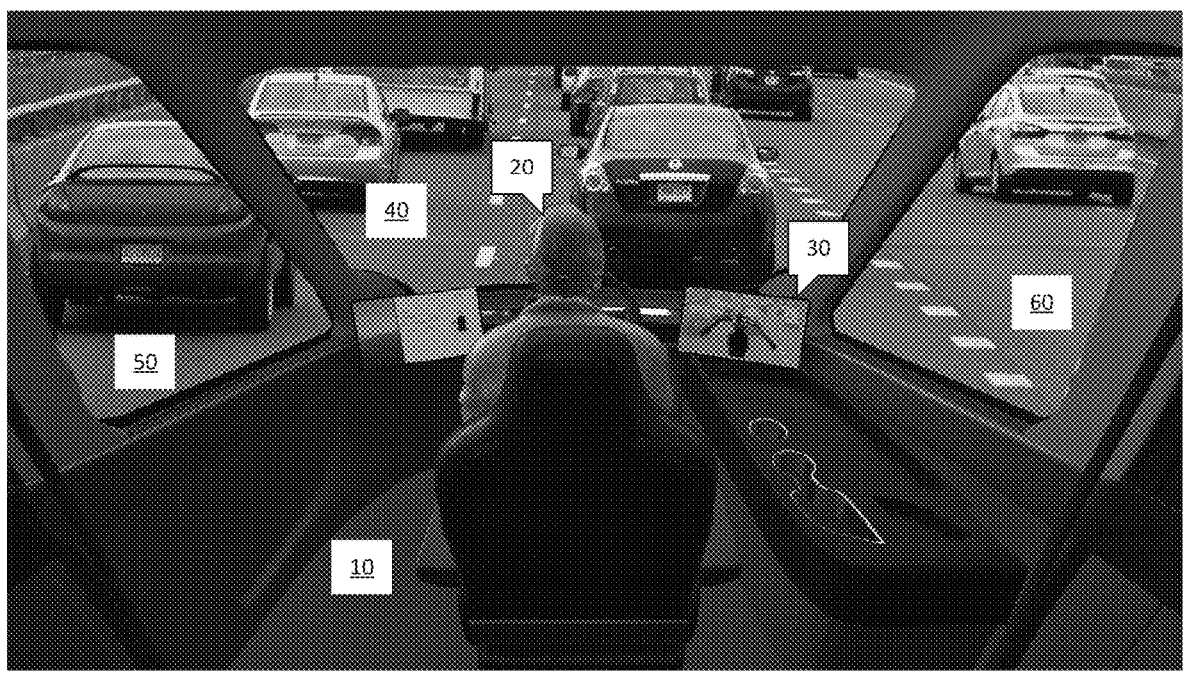
FIG. 1 is a photo-realistic rendering of a human passenger in a semi-autonomous vehicle looking forward through the front windshield.

The present invention introduces the use of a dynamic online and real-time virtual humans, whose behaviors are associated with inputs and outputs of an autonomous control system, to facilitate real human awareness of and trust in the autonomous control system. To foster the awareness and trust, the virtual humans themselves exhibit situational awareness via apparent (e.g., rendered) behaviors based on inputs such as direct system measures, functions of the measures, estimates of state based on measures, and estimates of state based on a priori constraints.

The virtual humans also exhibit situational control via apparent behaviors associated with outputs such as direct control of devices (including control system feedback), functions of control (e.g., abstractions of control), actions based on high-level goals, and the optional use of virtual versions of conventional physical controls. A dynamic virtual human who continually exhibits awareness of the system state and relevant contextual circumstances, along with the ability to directly control the system, is used to reduce negative feelings associated with the system such as uncertainty, concern, stress, or anxiety on the part of real humans.

Unlike the prior art, the virtual human is based directly on the inputs and outputs of the autonomous control system, where "inputs and outputs" includes direct measures/estimates and controls, derived measures/estimates and controls, and associated a priori constraints. This contrasts with the use of a virtual human simply for more natural conversational interfaces. The primary advantage here is that the real humans witness a virtual human who appears to be both situationally aware and reliably in control of the system, in a way that corresponds directly to the real system inputs (e.g., sensor measurements) and real system outputs (e.g., control of a vehicle).

One possible embodiment involves a separate subsystem that receives select input and output signals from the primary autonomous control system, including direct measures/outputs, estimates, functions of measures and estimates, predictions of events, high-level control, etc. The system would then maintain an ongoing dynamic (time-varying) representation of the virtual human, who would always (as a default) exhibit some "idle" behavior approximating that of a real human. For example, they would continually move their body in small amounts, occasionally look around for no apparent reason, blink, sniff, etc. This sedentary behavior would be smoothly transitioned into direct input or output behaviors, e.g., a head turning towards an emergency vehicle, and the hands appearing to turn the steering wheel as the autonomous system pulls the car off the road.

An embodiment may employ what a person of ordinary skill would recognize as some form of Augmented Reality (AR), e.g., the virtual human and virtual controls could be displayed via a head-worn stereo display, a fixed auto-stereo display, or a monocular display that is configured to apparently position the virtual human in the desire location. Some versions of such AR display paradigms might require a form of six-degree-of-freedom (6 DOF) tracking of a display or the user's head with respect to the car, to render the virtual human in the proper place, shape, etc. etc. The disclosed techniques could also be employed without AR; for example, the aware and acting virtual human could be shown using a conventional 2D display mounted in a vehicle dashboard or center console, on a conventional computer monitor, or on the display of a tablet computer or a smartphone.

The appearance of the virtual human need not be limited to just the users of the system. For example, in the case of an autonomous car, pedestrians or bystanders (real humans who are NOT in the vehicle) could also see the virtual humans if they (the pedestrians or bystanders) themselves have AR capabilities, e.g., see an apparently aware and in control "human" parking the car. This could increase the confidence of vulnerable nearby individuals (e.g., pedestrians) that the system is safe.

Situational Awareness:

A virtual human exhibiting situational awareness can be illustrated using the example of an autonomous automobile. System input signals will normally reveal or predict a critical emergent event such as another vehicle crossing dangerously in front of the autonomous vehicle, an objecting falling off a truck immediately in front of the vehicle, and a child on a bike (or an animal) darting in front of the vehicle. In each of these examples, a continuous combination of autonomous system inputs and outputs would be involved in actually controlling the vehicle. The very same inputs and outputs could, at the same time, be used to render a virtual human who appears to be aware and has the situation under control, e.g., the virtual human could turn their head toward the unexpected object, verbalize awareness, and appear to be acting to control the vehicle (per the actual outputs). Another example involves an autonomous vehicle changing lanes.

Before an autonomous system would initiate a lane change, the autonomous vehicle's system sensors would be used to scan the space around the car, looking for (ensuring the absence of) objects. In this case, the virtual human would turn their head, appearing to check for clearance before changing lanes. The virtual human's hands would appear on the real (or a virtual) steering wheel, and they would appear to turn the wheel (via the output signals affecting actual turning) simultaneously as they continue to check for clearance (via the real input signals associated with sideways-looking sensors).

It is important to convey sufficient situational awareness and control even in the absence of specific events, i.e., when the system inputs do not indicate any immediate or predicted danger. In such circumstances, to reflect the continuous ongoing monitoring of the input signals, the virtual human could periodically turn its head as if scanning mirrors (rear, side), checking traffic on sides/behind, etc. The behavior should appear to be reliable but random (implemented via a pseudorandom sequence) so that the real human perceives it as being real, thoughtful, and reliable.

In response to an approaching emergency vehicle, the virtual human should turn its head toward the emergency vehicle where it is sensed, verbalize awareness, and if the control system decides to pull off the road, the virtual human should (per the system inputs and outputs) appear to simultaneously check for clearance while turning the wheel (similar to the lane change example above) while also appearing to apply the brakes.

The virtual human need not remain inside the car—indeed, the virtual human should move to a pose that conveys the best representation of human awareness correlated with the system inputs (e.g., sensors). For example, when parallel parking, the virtual human could teleport or step out of the car, position herself on the sidewalk near the front of the car, and gesture to indicate the clearance is OK (or "stop") corresponding to what the system senses and does.

During a traffic jam, the virtual human could walk, run, or fly ahead (outside of the car) to "see what's happening" and then report back to the inhabitants. Or, the virtual human could deploy a virtual (or real) drone to fly on ahead and could appear to look at a tablet display providing information to the virtual human.

In systems where there is no apparent direct physical control, e.g., an autonomous system to make and operationalize stock buying/selling decisions, or a system for autonomous medical diagnosis, in response to system input, the virtual human could appear to consult corresponding sources (inputs) such as a newspaper, a television, a stock "ticker" feed, a medical journal, etc. The virtual human could even appear to consult other virtual humans—a behavior that can further increase confidence in the apparent decisions.

Reliable Control:

A virtual human exhibiting reliable control of an autonomous system can also be illustrated using the example of an autonomous automobile. For example, as indicated above, the virtual human could be rendered such that their hands are gripping the real (or a virtual) steering wheel. As the system commands the electro-mechanical/hydraulic actuators to turn the vehicle, the virtual human should be correspondingly rendered as if affecting the turning in a conventional (not-autonomous) vehicle. If the autonomous system determines that the horn should be sounded (a "honk"), the virtual human's hand should follow the "honk" output—moving to and appearing to press the real (or virtual) horn button. As indicated above, in the case of an approaching emergency vehicle, when the autonomous system determines it needs to apply the brakes, and the output commands are sent to the braking subsystem, the virtual human's foot should move to and appear to press on the real (or virtual) brake pedal. Similarly, if the autonomous system sends an output signal to engage a turn signal, the virtual human should appear to be the one initiating the action.

Reliable control goes beyond driving (controlling the vehicle rate and direction) to controls, including interior amenities such as climate control, entertainment, mobile telephone use, etc. For example, if a system input indicates a user request to "play jazz" or "lower the temperature" or "call my mother," the virtual human could move their head to indicate listening, and then when the autonomous system creates an output signal to play the music (or adjust the climate control or use the phone) the virtual human would be moved in ways that correspond to a real human assisting with those activities, in synchrony with the output signals.

The actions of the virtual human might be accompanied by temporary virtual objects apparently associated with actions, e.g., a virtual climate control panel could appear when the virtual human is going to change the temperature, and a virtual radio when changing the station. If the virtual human is seated in front of real physical controls, system outputs should be programmed to move the virtual human toward, on, and interacting with those controls. If there are no real physical controls in front of the virtual, e.g., the virtual human is in the passenger seat, or the car is very advance (with no apparent conventional controls), the system could optionally render conventional virtual controls, which the virtual human would then interact with in response to system output commands.

In systems where there is no apparent direct physical control, e.g., an autonomous system to make and operationalize stock buying/selling decisions, or a system for autonomous medical diagnosis, in response to system output, the virtual human could appear to select options (outputs) corresponding to the actual outputs, e.g., push virtual buttons, type virtual commands, or even instruct another virtual human to carry out the stock order or to convey the medical diagnosis.

Variations

As indicated above, the position and apparent perspective of the virtual human could be varied to match the current circumstances associated with the automated control system inputs or outputs. For example, as indicated above, the virtual human could be positioned in the "driver's seat" in front of real controls, or in a seat where there are no controls, but virtual controls could (optionally) be rendered. Note that while the inventors do not envision a virtual human superimposed on top of a real human, there might be circumstances where that would be beneficial. As indicated above with the parallel parking example, there are circumstances where it would be natural and beneficial to have the virtual human appear outside the vehicle in the way a real human would, if they were helping to park.

The demographic and other characteristics of the virtual human could be varied to better suit the real human users of the autonomous system (e.g., autonomous car, stock market system, medical system). For example, the size of the virtual human could be varied anywhere within a range of normal human stature, but also to allow more "superhuman" behavior such as a miniature virtual human appearing on the dashboard, the hood of the car, etc. The gender, race, apparent ethnicity, and culturally-specific behaviors of the virtual human could be varied. The number of virtual humans could be varied—two or more virtual humans appearing to collaborate, or consult can convey more certainty to a real human user.

Turning to FIG. 1, vehicle 10 has a real human occupant 20 facing forward with a view-through front center windshield 40, front left windshield 50, and front right windshield 60. In this example, occupant 20 has vehicle controls available, but vehicle 10 is in autonomous operation. In this embodiment, the presentation of control virtual human 70 is a 2-dimensional video monitor 30.

Figure 2:
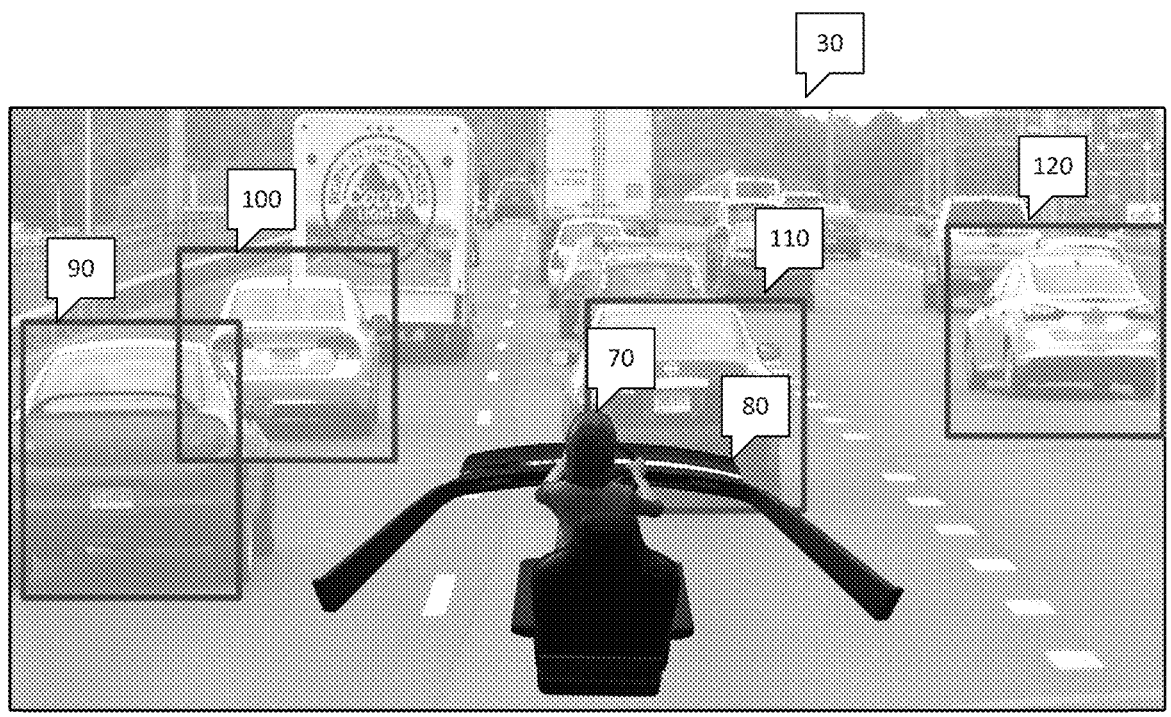
FIG. 2 is a computer rendering of a virtual human operator of the vehicle overlaid to a front-facing camera image of real-time traffic.

The contents of video monitor 30 are shown in FIG. 2, wherein control virtual human 70 is placed in the same or an analogous vehicle control system 80 as occupant 20. Vehicle 10 has a front-facing camera that provides a real-time video feed of the view out of windshields 40, 50, and 60. Control virtual human 70 is displayed over the video feed, and the data processing systems of vehicle 10 display bounding-boxes over detected vehicles 90, 100, 110, and 120. This provides feedback to occupant 20 that both vehicle 10 and also control virtual human 70 is situationally aware of the traffic ahead. Control virtual human 70 may move her head facing vehicle 90, then vehicle 100, then vehicle 110, and finally, vehicle 120. This conveys an additional assurance to occupant 20 that the autonomous systems of vehicle 10 are operating properly.

As vehicle 10 navigates, control virtual human 70 not only conveys behaviors responsive to sensor data, it displays operational activity. For example, as vehicle 10 moves within a lane, control virtual human 70 turns the steering wheel in synchronization. For a lane change, control virtual human 70 operates a turn signal.

Figure 3:
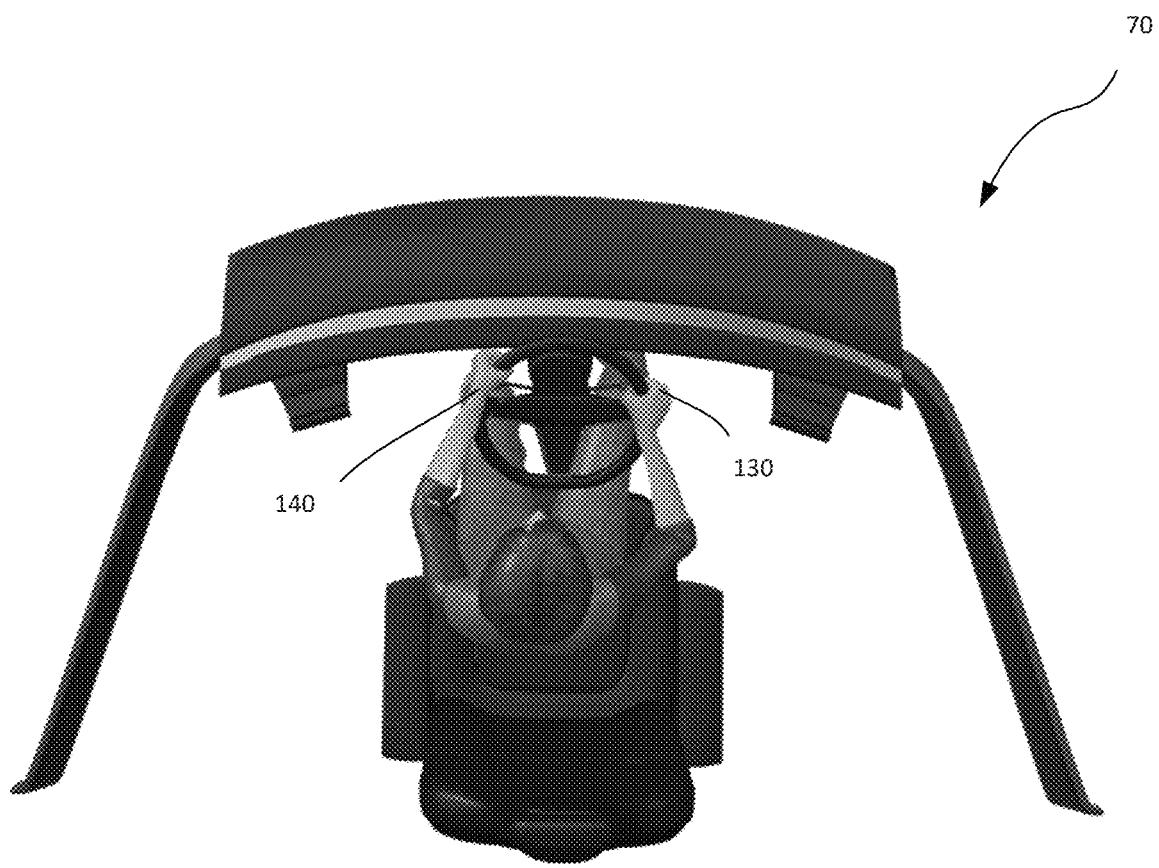
FIG. 3 is a top-down view of a computer rendering of a virtual human operator of the vehicle.
Figure 4:
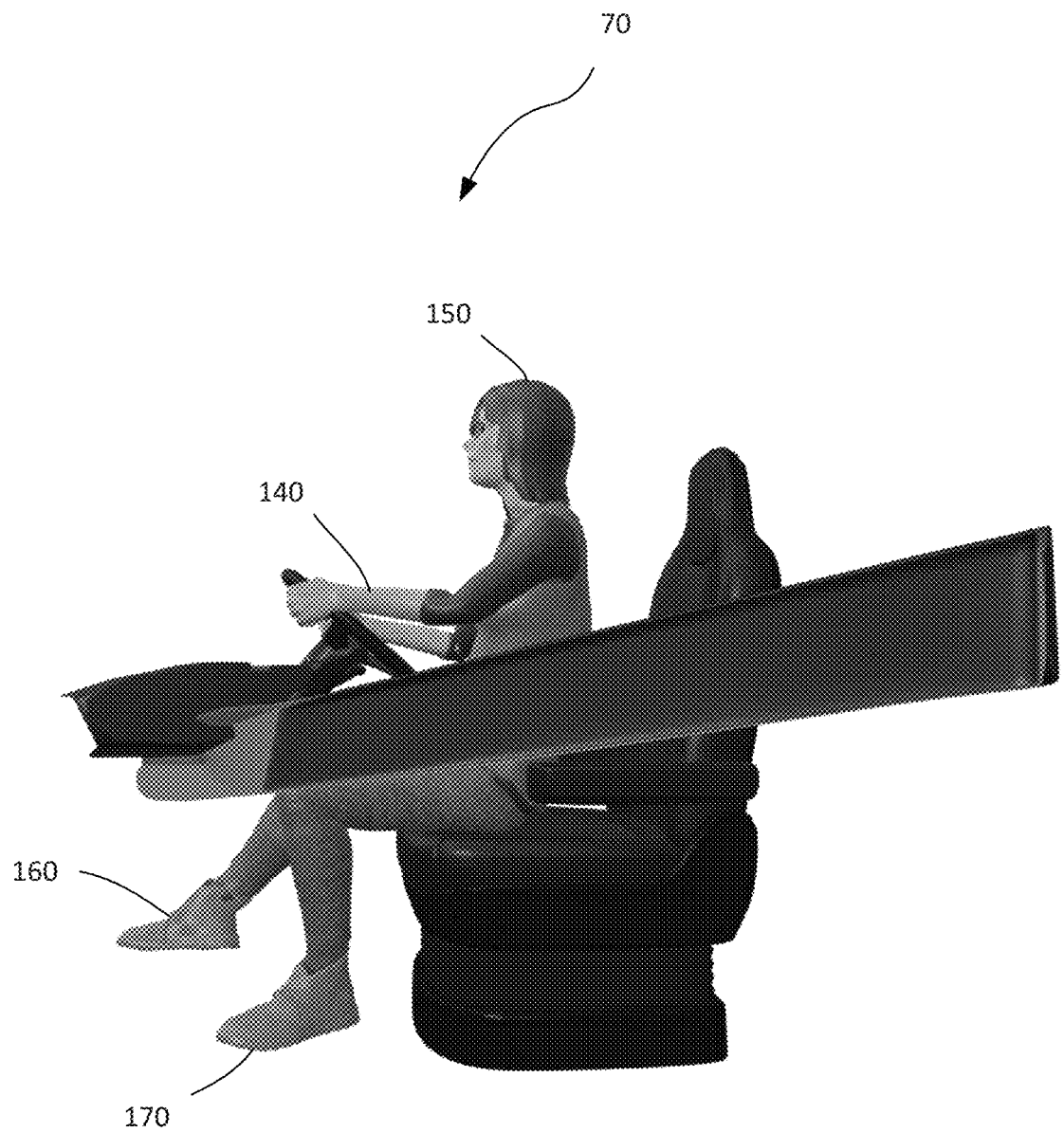
FIG. 4 is a side, elevational view of a computer rendering of a virtual human operator of the vehicle.
Figure 5:
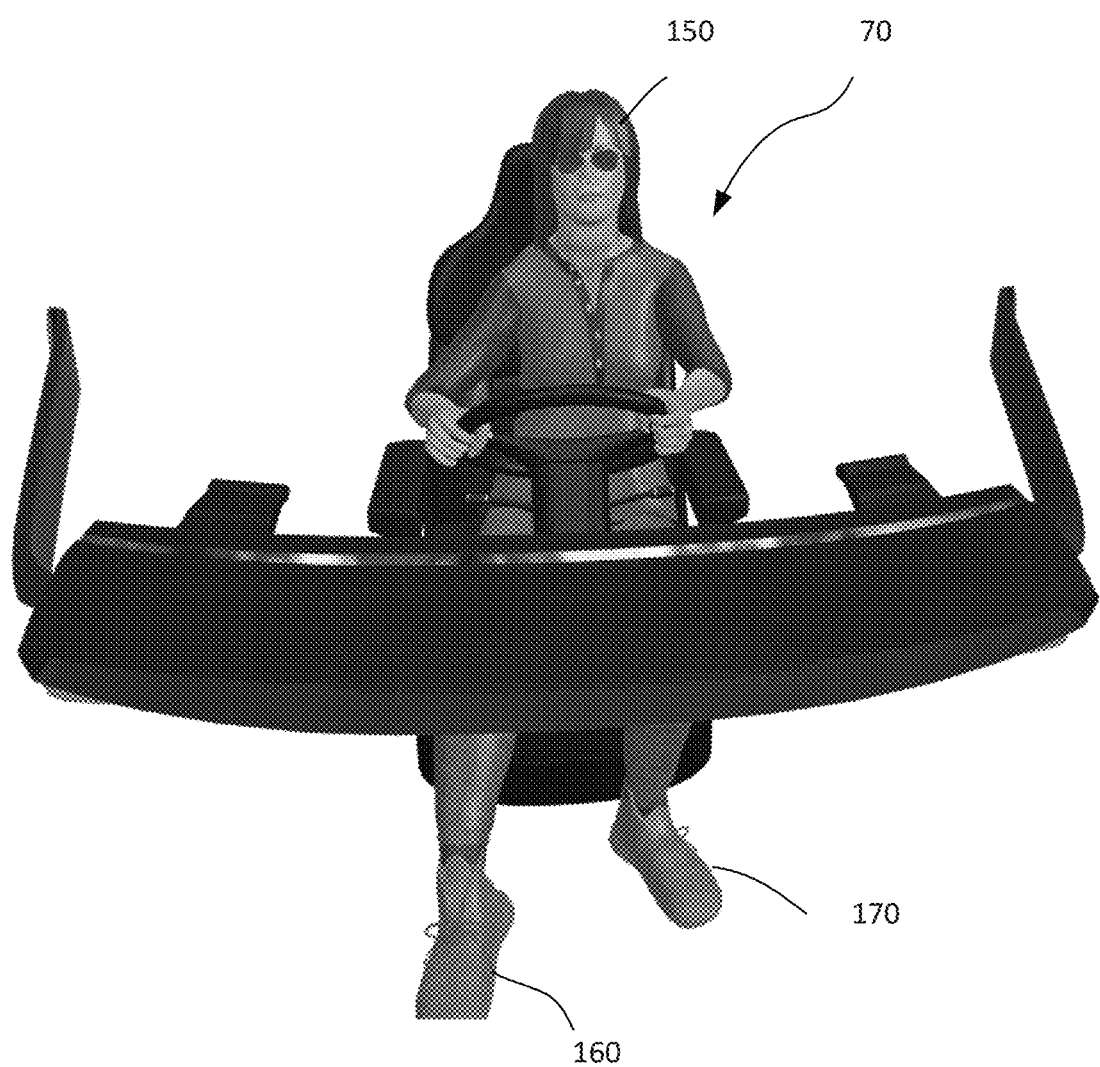
FIG. 5 is a front, elevational view of a computer rendering of a virtual human operator of the vehicle.
Figure 6:
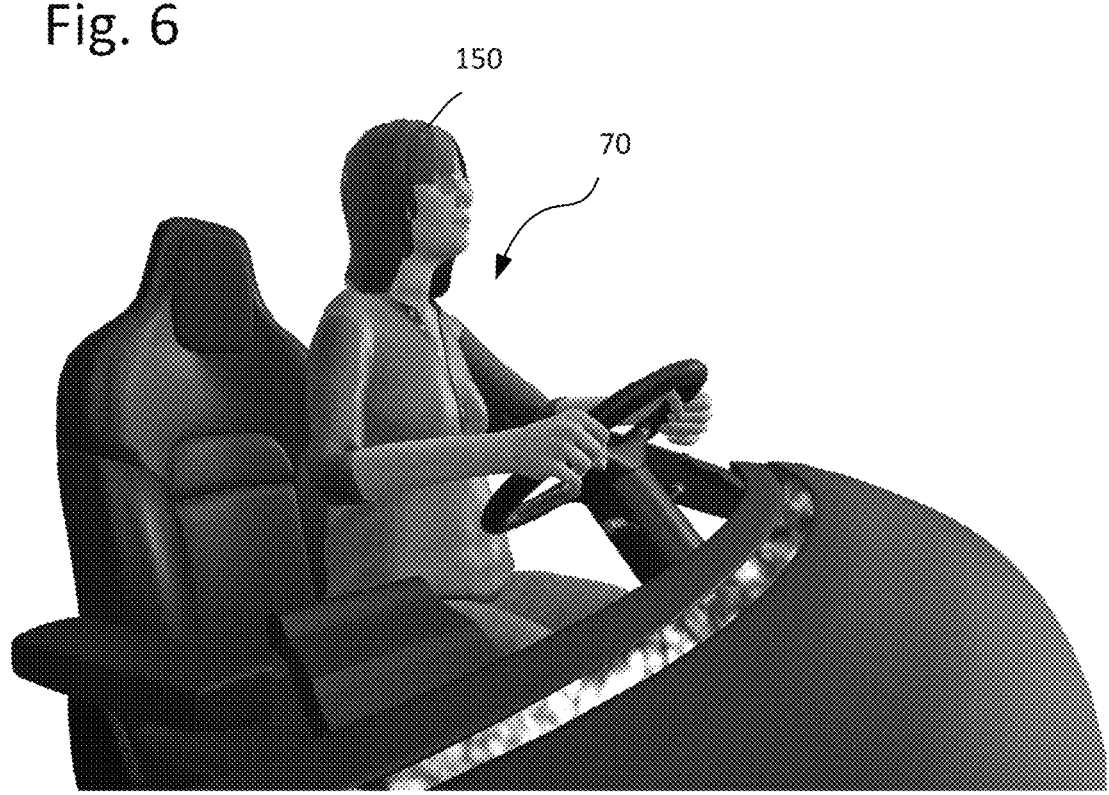
FIG. 6 is a perspective, elevational view of a computer rendering of a virtual human operator of the vehicle.

FIGS. 3-6 show control virtual human 70 in different views. Control virtual human 70 left hand 140 and right hand 130 moves to turn the steering wheel, operate lights, horns, turn signals, and the like. A limitation of the top-down view of FIG. 3 is that the feet of control virtual human 70 are not visible. Accordingly, to convey acceleration and braking activities, FIGS. 4 and 5 show the right foot 160 and left foot 170 of control virtual human 20. The right foot 160 typically would move between the accelerator pedal and brake pedal (not shown). However, another aspect of the present invention is that the control virtual human 70 displays a continuous feedback loop of situational awareness and attentiveness. This may be conveyed by having the left foot 170 taps in synchronization to music selected by occupant 20. Control virtual human 70 may also occasionally speak to occupant 20, cough, sneeze, stretch, turn her head 150, or fidget in place consistent to an attentive, competent driver.

Figure 7:
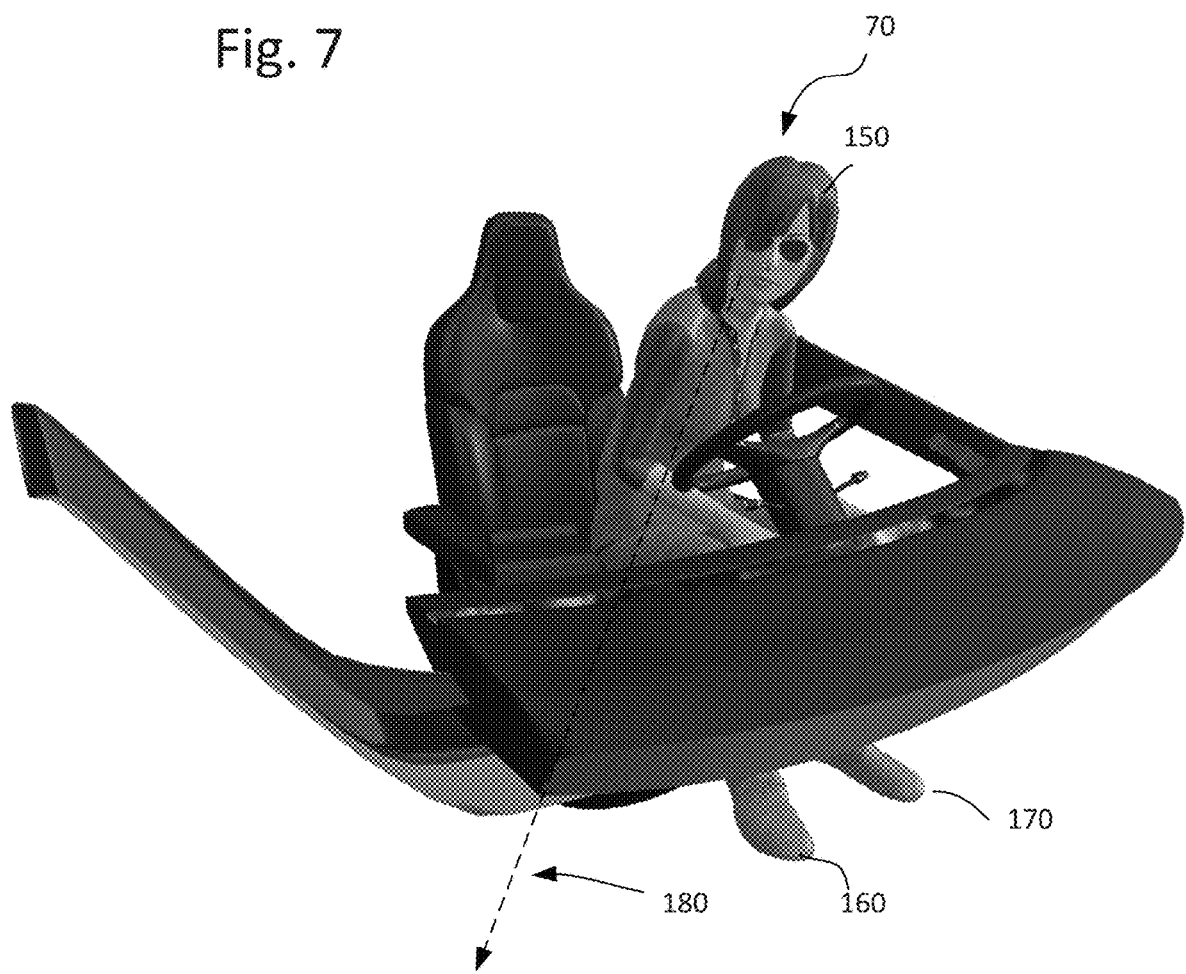
FIG. 7 is a perspective, elevational view of a computer rendering of a virtual human operator of the vehicle directing her attention to a forward-facing lower-right quadrant of her visual field.
Figure 8:
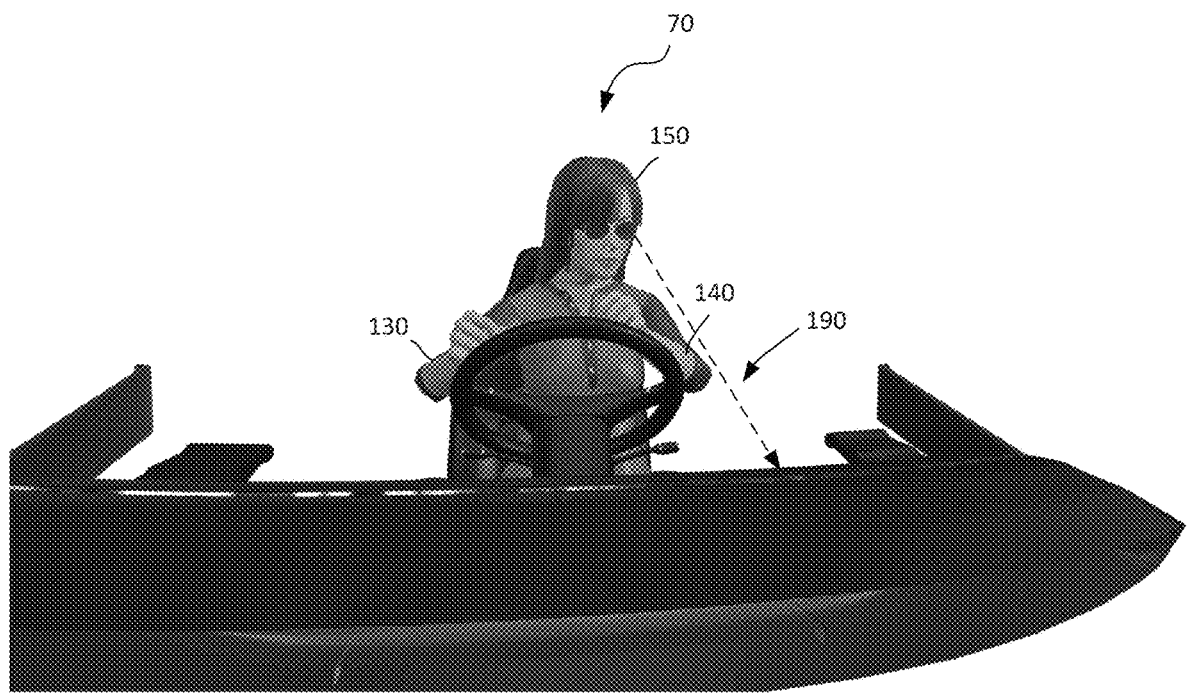
FIG. 8 is a perspective, elevational view of a computer rendering of a virtual human operator of the vehicle directing her attention to a downward-facing lower-left quadrant of her visual field.

FIG. 7 shows control virtual human 70 leaning forward in her seat, turning her head to the right, and examining a vision line 180. This may be done responsive to an object detected by vehicle 10. For example, vehicle 10 may be stopped at a cross-watch, and a pedestrian may be crossing the path of vehicle 10 despite the vehicle 10 having a green light to proceed forward. The reaction of control virtual human 70 and focus on a detected object conveys assurance to occupant 20 that the autonomous systems of vehicle 10 are properly detecting surroundings and reacting correctly. FIG. 8 shows control virtual human directing her vision along path 190 to the lower-left portion of the dash showing a navigation notice. This conveys to occupant 20, normal, predictable behavior. Obviously, vehicle 10 does not need to visually display navigation information to the occupant and certainly not to the occupant through the rendered control virtual human 70 for technical operation. Rather, by conveying the manner of operation to occupant 20, the anxiety of occupant 20 is reduced through such visual, simulated actions.

Figure 9:
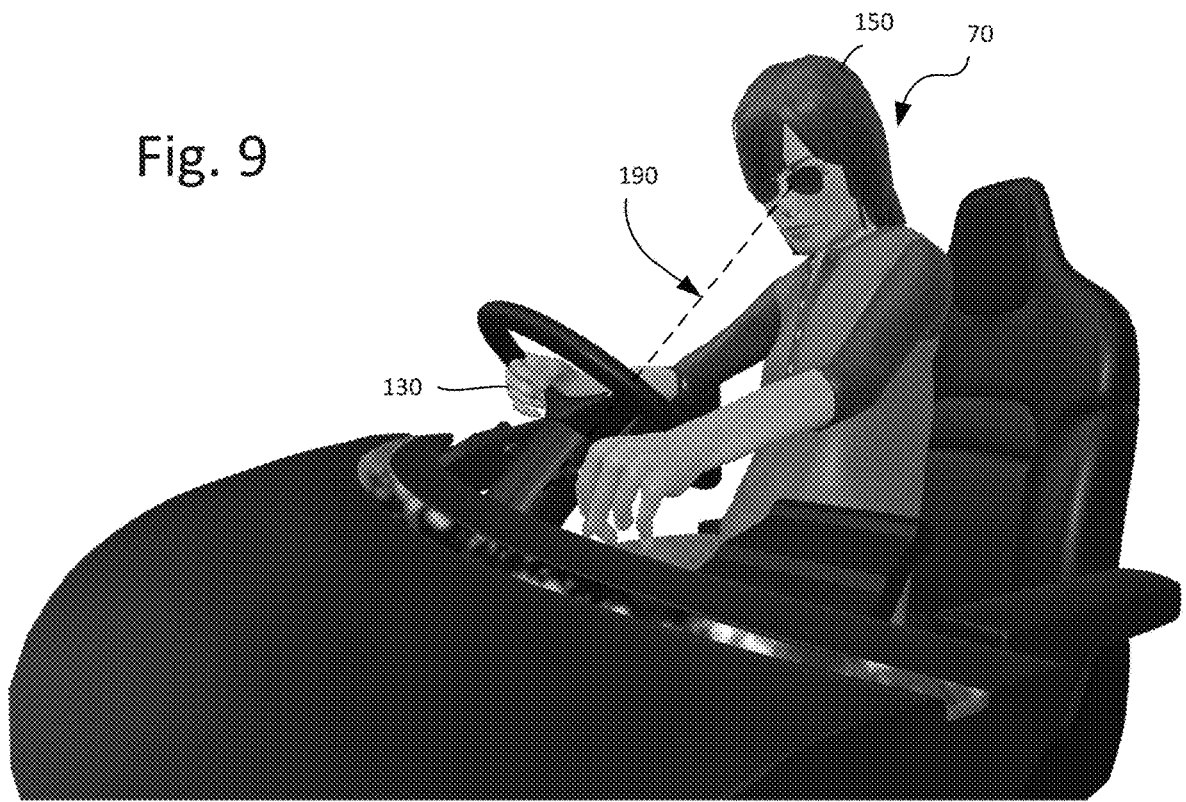
FIG. 9 is an alternative perspective, elevational view of a computer rendering of a virtual human operator of the vehicle directing her attention to a downward-facing lower-left quadrant of her visual field.
Figure 10:
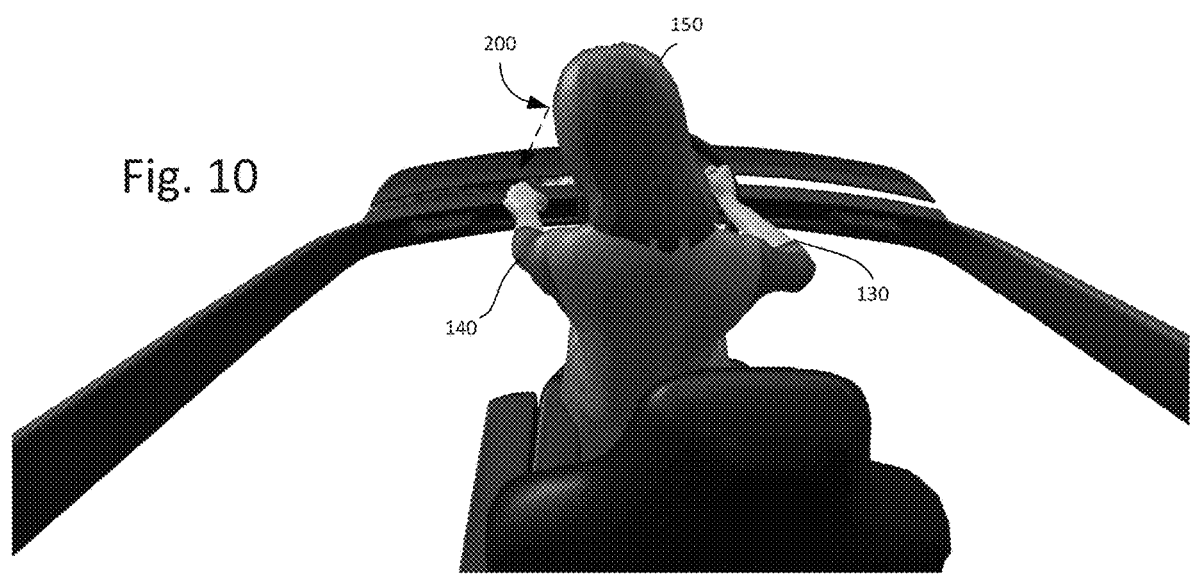
FIG. 10 is a rear, elevational view of a computer rendering of a virtual human operator of the vehicle directing her attention to a downward-facing lower-left quadrant of her visual field.

FIG. 9 shows control virtual human 70, continuing her vision along path 190, reaching out to operate a simulated control on the virtual "dashboard." This might be turning on vehicle lights. Control virtual human 70 might also speak audibly to occupant 20 that it is time for her to turn on the vehicle running lights for safety. FIG. 10 shows the same simulated operation in a forward-facing, elevated view. Occupant 20 may set a preferred view, or the view may change automatically in the context of the actions of control virtual human 70 to optimally show what activity is taking place. Optionally, multiple views of the same 3-dimensional, rendered environment may be showed concurrently.

Figure 11:
FIG. 11 is an elevated, perspective view of a rigged, virtual human.

FIG. 11 shows a rigged control virtual human 75 in a T-pose. Rigged control virtual human 75 may be configured of any appearance desired by occupant 20 or other decision-making entities.

Figure 12:
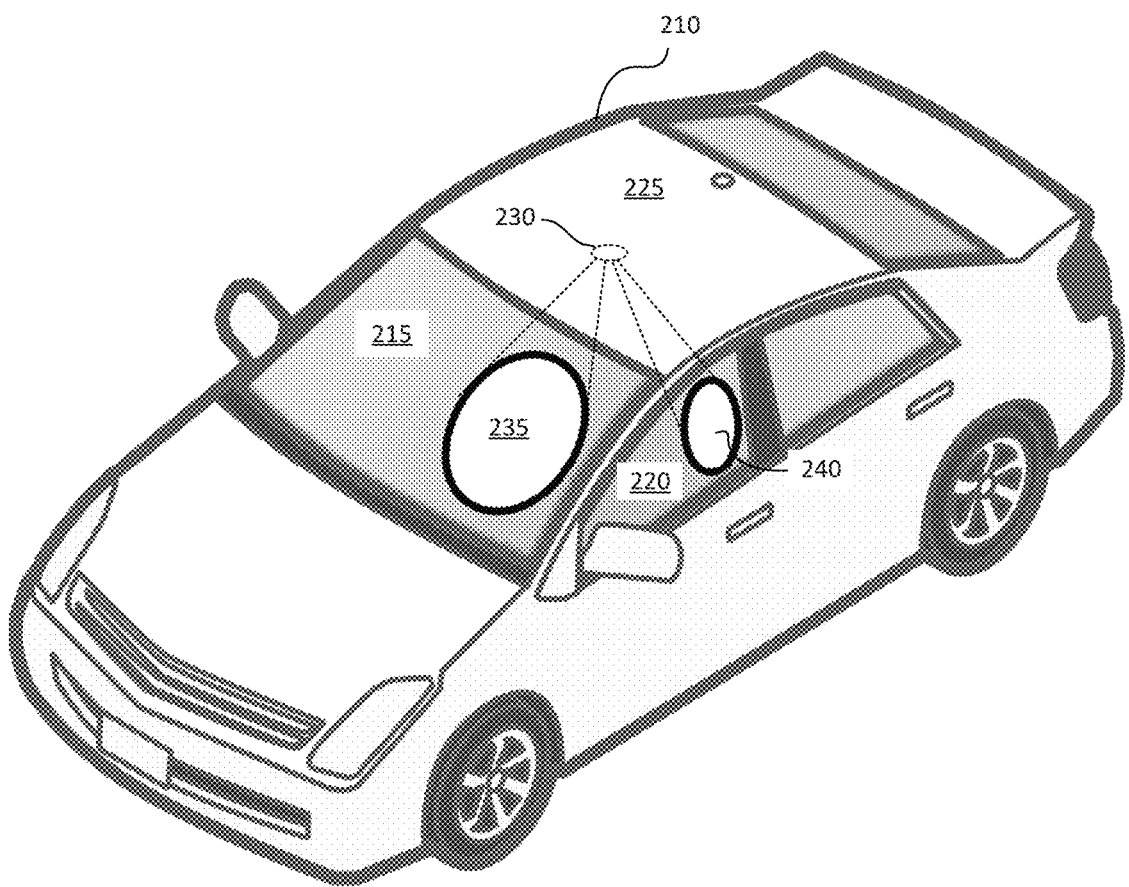
FIG. 12 is an isometric view of a vehicle having an interior projection of images onto the windshield and driver-side door.

In FIG. 12, vehicle 210 has a front-facing windshield 215 and a driver-side window 220. On vehicle roof 225, a projection apparatus 230 displays heads-up image 235 on windshield 215 and another heads-up image 240 on driver-side windows 220. The projection apparatus may also be located in the dashboard of vehicle 210 to project image 235 and in the inner door frame of the driver-side door to project image 240. Images 235 and 240 are viewable from both the interior and exterior of the vehicle to convey information about the autonomous operation of vehicle 210. In another embodiment of the invention, transparent organic light emitted diode (OLED) window conveys the rendered image directly instead of using projection.

Figure 13:
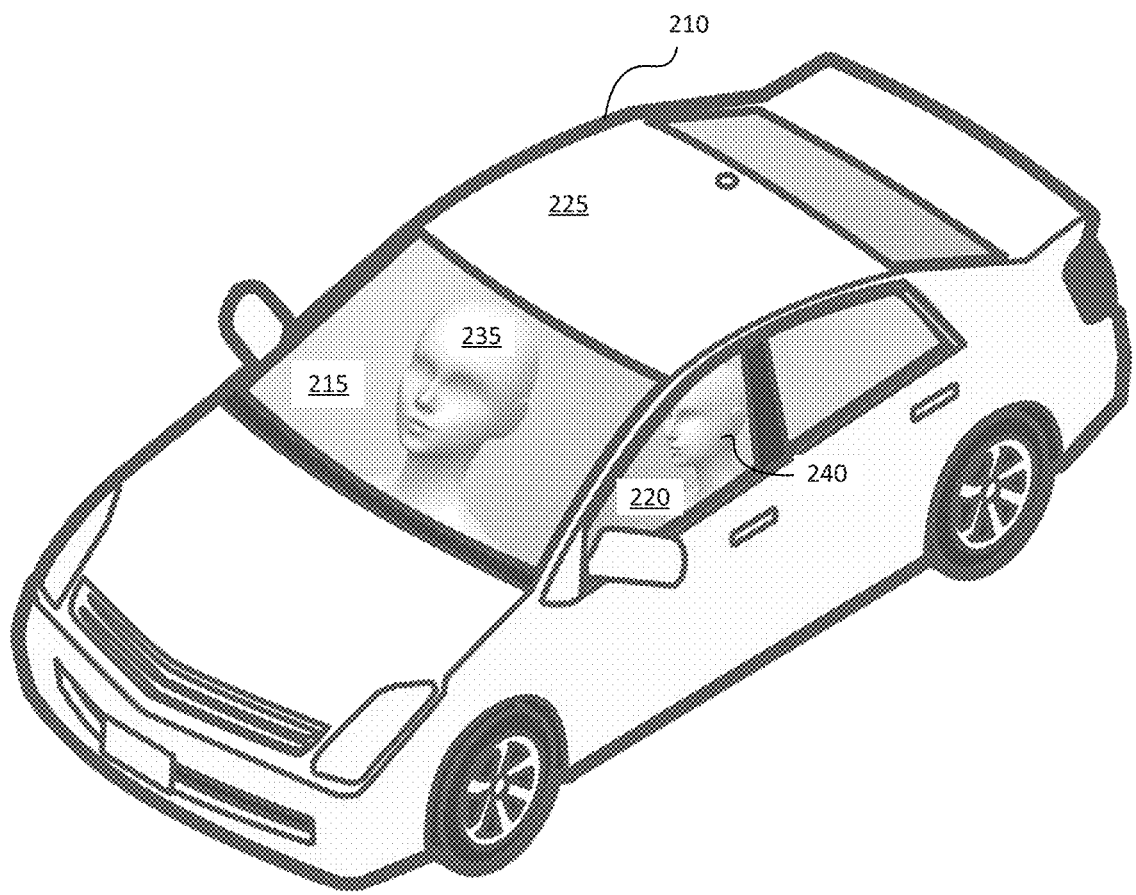
FIG. 13 is an isometric view of a vehicle having an interior projection of human heads onto the windshield and driver-side door.
Figure 14:
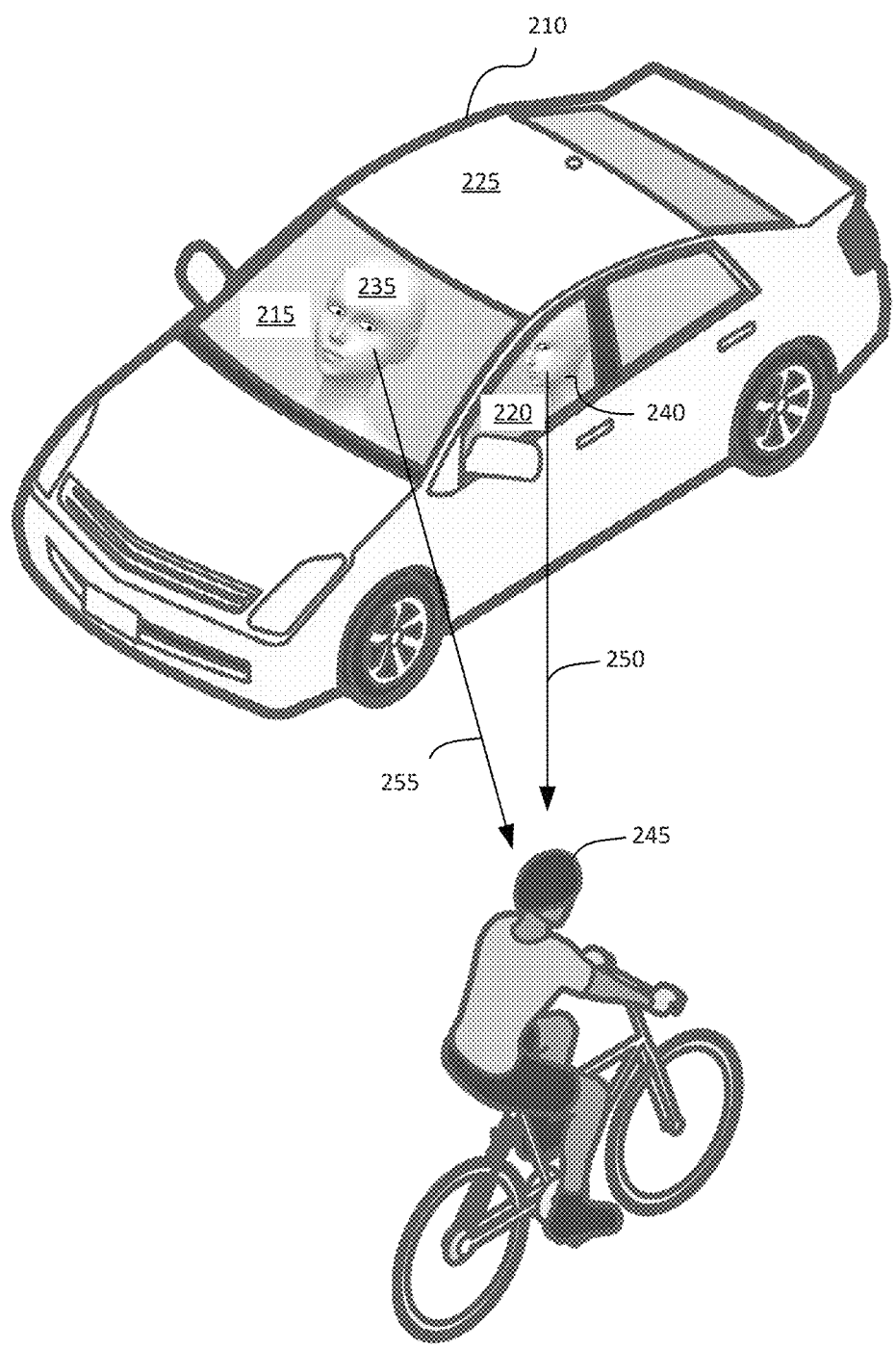
FIG. 14 is an isometric view of a vehicle having an interior projection of human heads onto the windshield and driver-side door conveying visual acknowledgment of a cyclist.

FIG. 13 shows an embodiment of the invention wherein image 235 is a front-facing virtual human head, and image 240 is an elevated side view of a virtual human head. Images 235 and 240 of FIG. 13 convey to passengers in vehicle 210 (if any) and to persons outside the vehicle (e.g., cyclists, pedestrians, other drivers) that vehicle 210 is operating autonomously or semi-autonomously. This is shown in FIG. 14, wherein the sensors in vehicle 210 detect cyclist 245, and the projected images 235 and 240 take on attentive gestures, shifting their simulated attention to cyclist 245. Sensors in vehicle 210 determine the relative location of real-life cyclist 245 and cause the gestures to "track" the location of cyclist 245 relative to vehicle 210.

In an alternative embodiment of the invention, vehicle 210 wirelessly transmits to an augmented reality display worn by cyclist 245, rendered indicia acknowledging vehicle 210 has registered the presence of cyclist 245. For example, the augmented reality display (e.g., MICROSOFT HOLOLENS) displays a green "checkmark" over the real-time spatial location of vehicle 210 with respect to cyclist 245. Thus, cyclist 245 receives visual assurance that vehicle 210 is "aware" of the presence of cyclist 245. This reduces the cognitive load on cyclist 245, who would otherwise exercise greater monitoring that vehicle 210 "sees" cyclist 245. In this manner, whether vehicle 210 is autonomous, semi-autonomous, or manually operated, sensors in vehicle 210 do more than prevent accidental impact into cyclist 245. A trust loop is established that reduces the uncertainty and/or anxiety of cyclist 245 with respect to vehicle 210.

Figure 15:
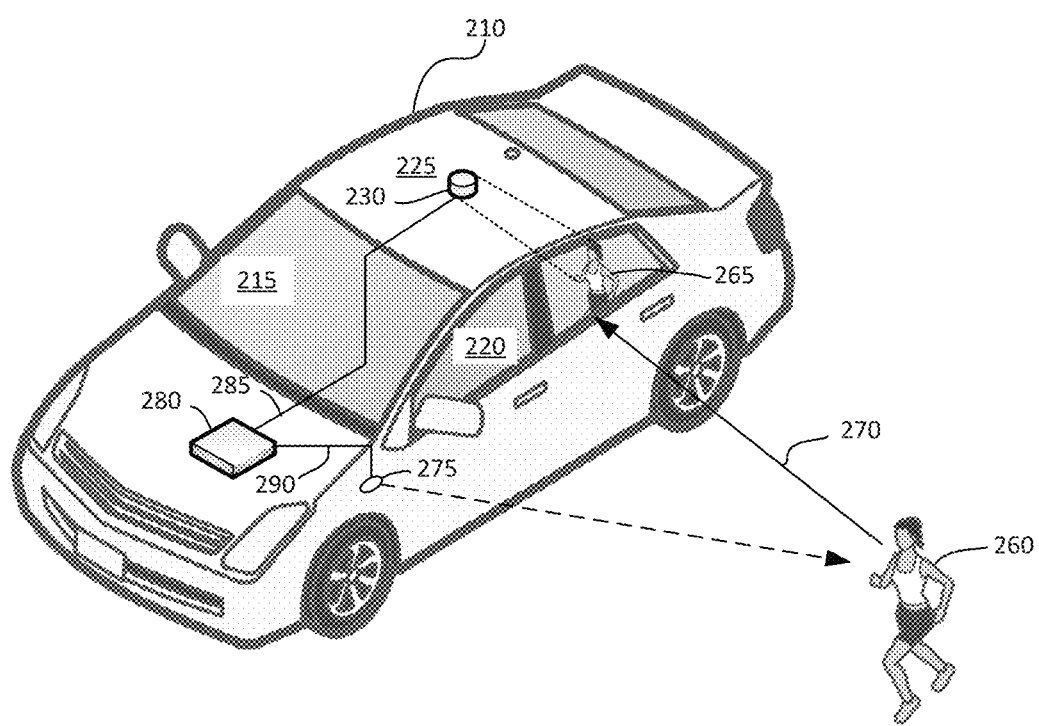
FIG. 15 is an isometric view of a vehicle having an interior projection of a captured video image onto the rear, driver-side door window of a jogger.

A similar embodiment is shown in FIG. 15, wherein jogger 260 is otherwise unaware whether vehicle 210 is aware of her location and presence. In this embodiment, side-panel-mounted camera 275 captures a 180-degree field of view to the driver-side of vehicle 210. Camera 275 sends video feed 290 to processor 280, which extracts the jogger's image as an object of interest. A rendered image of jogger 260 is transmitted 285 to a projection apparatus 230, which is then displayed on rear driver-side window 265. Accordingly, jogger 260 has a line of sight 270, acknowledging that vehicle 210 is aware of her location and presence. As noted previously, an alternative embodiment of the invention may convey this information to an augmented reality display worn by jogger 260.

Figure 16:
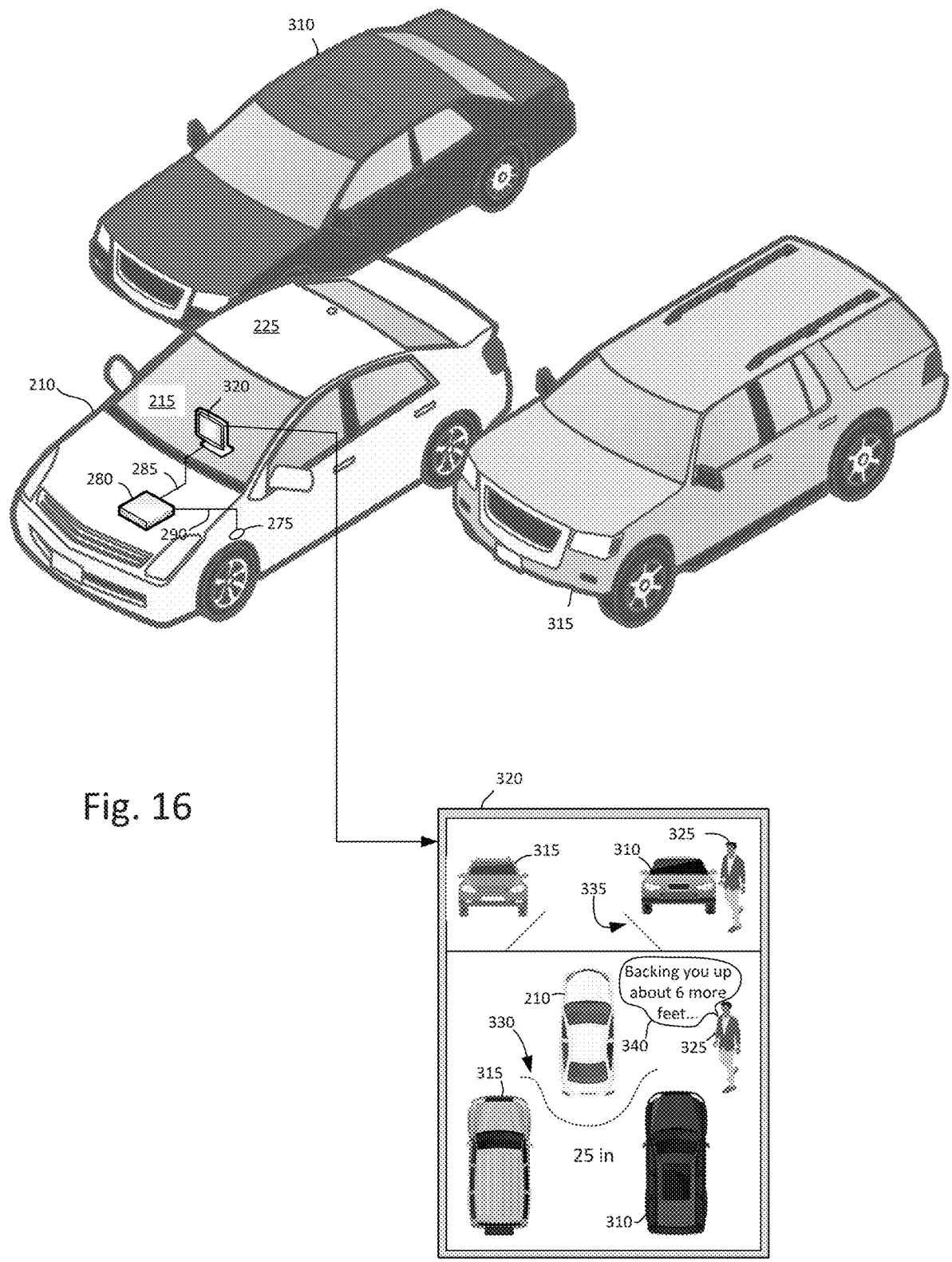
FIG. 16 is an isometric view of a vehicle backing into a parking spot showing a virtual human on a dashboard display screen guiding the vehicle's path.
Figure 17:
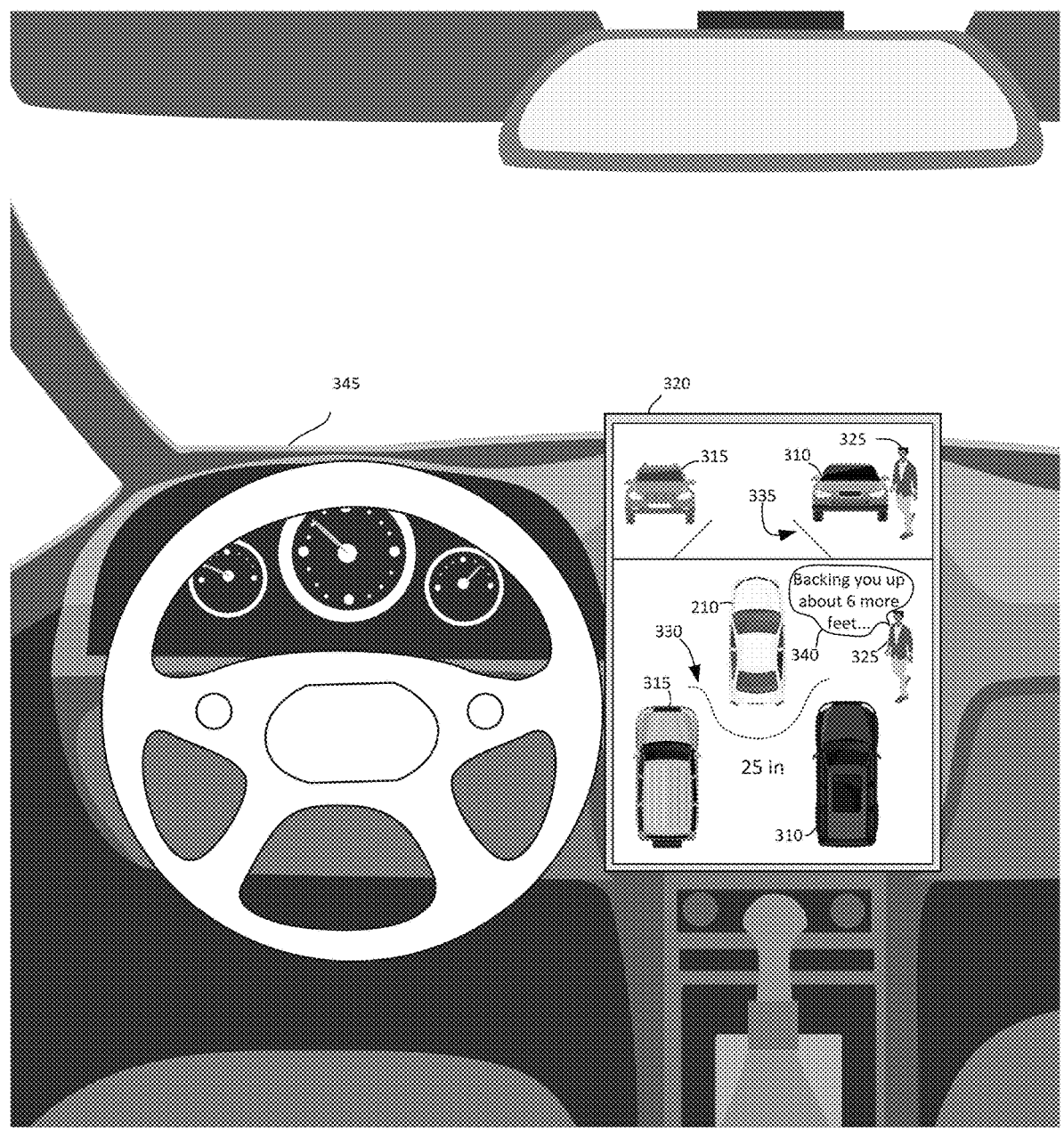
FIG. 17 is an elevated view of a vehicle dashboard showing a virtual human on a display screen guiding the vehicle's path.

In FIG. 16, vehicle 210 attempts to back into a parking space between sports utility vehicle (SUV) 315 and sedan 310. In-dash display 320 of vehicle 210 renders a backup camera display at the top one-third of the screen and a rendered top-down view of the parking distances in the bottom two-thirds of the screen. Virtual human 325 is rendered by processor 280 and superimposed onto the screen "assisting" with the parking. In one embodiment, vehicle 210 is parking autonomously, and the rendering of virtual human 325 "guiding" vehicle 210 into the space reduces cognitive load and/or passenger anxiety. Alternatively, virtual human 325 may guide into the parking space a driver of vehicle 210 operating in manual (non-autonomous) control. FIG. 17 shows in-dash display 320 mounted into a vehicle dashboard 345 from the perspective of a person seated in the driver's seat of vehicle 210.

Figure 18:
FIG. 18 is an elevated view of a vehicle dashboard showing a virtual human on a heads-up windshield display guiding the vehicle's path.

FIG. 18 shows an alternative embodiment to FIG. 17, wherein processor 280 renders through a heads-up display, virtual human 325 guiding vehicle 210 into the parking space. In yet another alternative embodiment of the invention, virtual human 325 is rendered in an augmented reality display worn by an individual inside or outside of vehicle 210.

Figure 19:
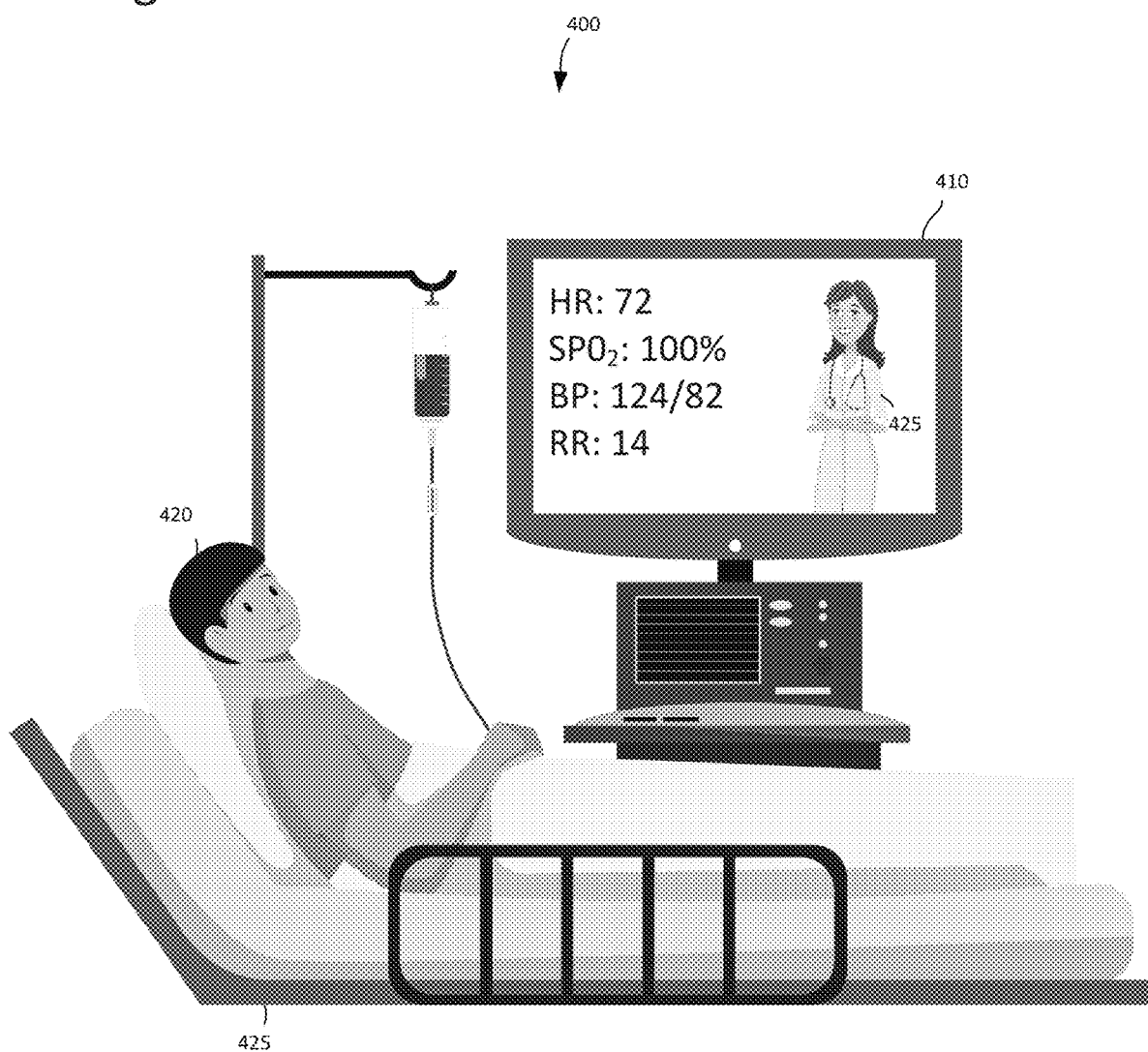
FIG. 19 is a side, elevation view of a patient and vital sign displaying showing a virtual human physician in a relaxed state.
Figure 20:
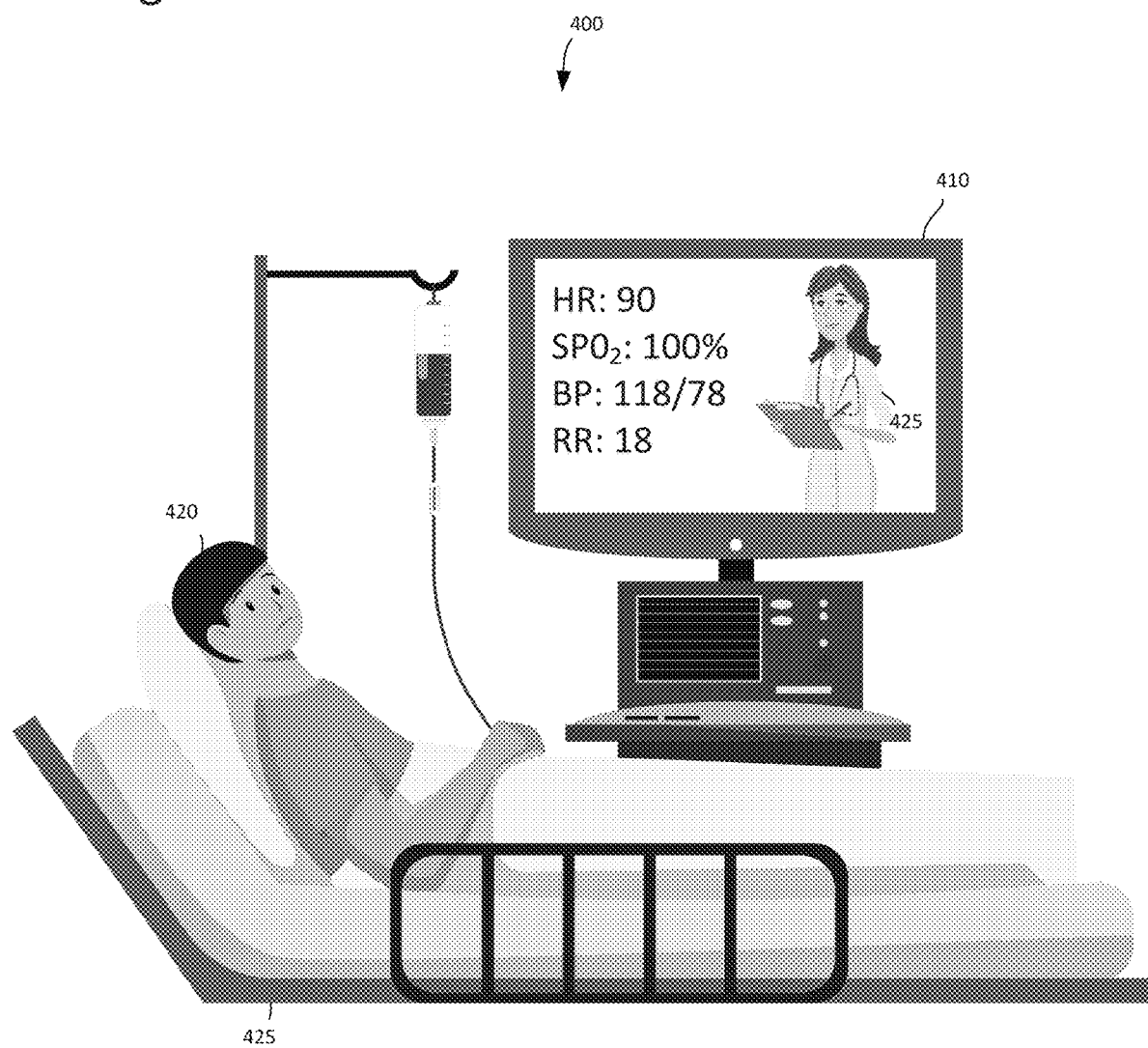
FIG. 20 is a side, elevation view of a patient and vital sign displaying showing a virtual human physician in a concerned state.

The inventive concept of the present invention is transposable to various autonomous and semi-autonomous systems. One such application is in medical monitoring and automation. In FIG. 19, patient 420 reclines in hospital bed 425. Monitor 410 displays vitals such as heart rate, oxygen level, blood pressure, and respiratory rate values. Virtual human 425 is also displayed concurrently. The vitals in FIG. 19 is associated with patient 420 in a medically stable condition. Accordingly, virtual human 425 appears happy and relaxed. In an embodiment of the invention, virtual human 425 moves in an idle fashion to avoid her appearing "frozen" or static. Such small movements reassure patient 420 that virtual human 425 is actively engaged with vital sign monitoring. In FIG. 20, the vital signs of patient 420 are less ideal but do not necessarily require immediate action. Accordingly, virtual human 425 switches her expression and pose to one of heightened attention and concern. In the example illustrated, she picks up a clipboard and starts taking notes looking over at the vital sign readout. Finally, in FIG. 21, vital signs meet a preexisting threshold for signaling an alarm. Virtual human 425 shows she is calling for an attending nurse to come to the bedside of patient 420 to check on him.

Figure 21:
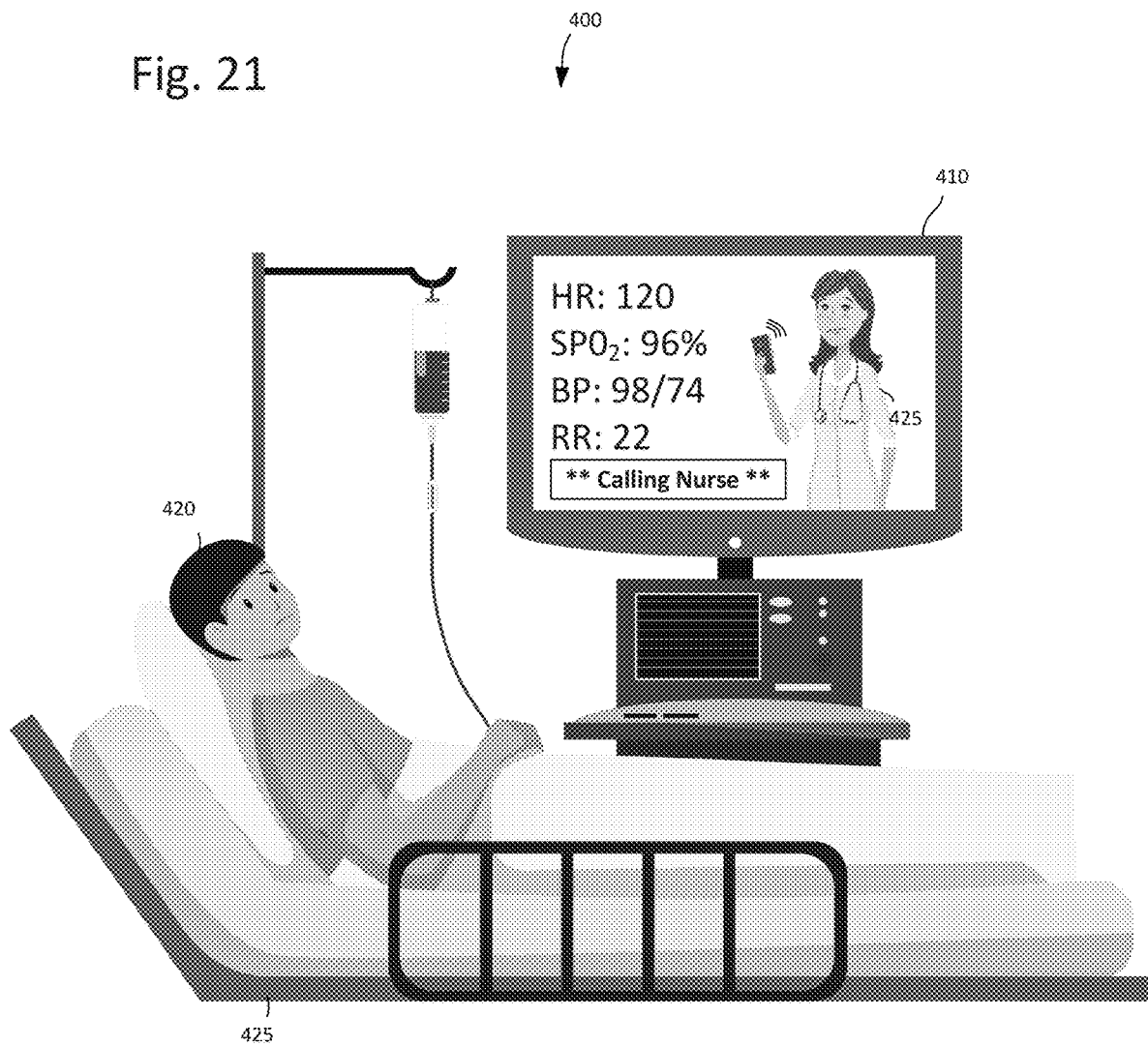
FIG. 21 is a side, elevation view of a patient and vital sign displaying showing a virtual human physician in an action state contacting a real-life attending nurse.

In an alternative embodiment of FIGS. 19-21, the virtual human is displayed to a nursing station monitor instead of the patient 420. In such an embodiment, the cognitive load is reduced on the medical practitioners as they have the assurance that patient 420 is actively monitored.

Figure 22:
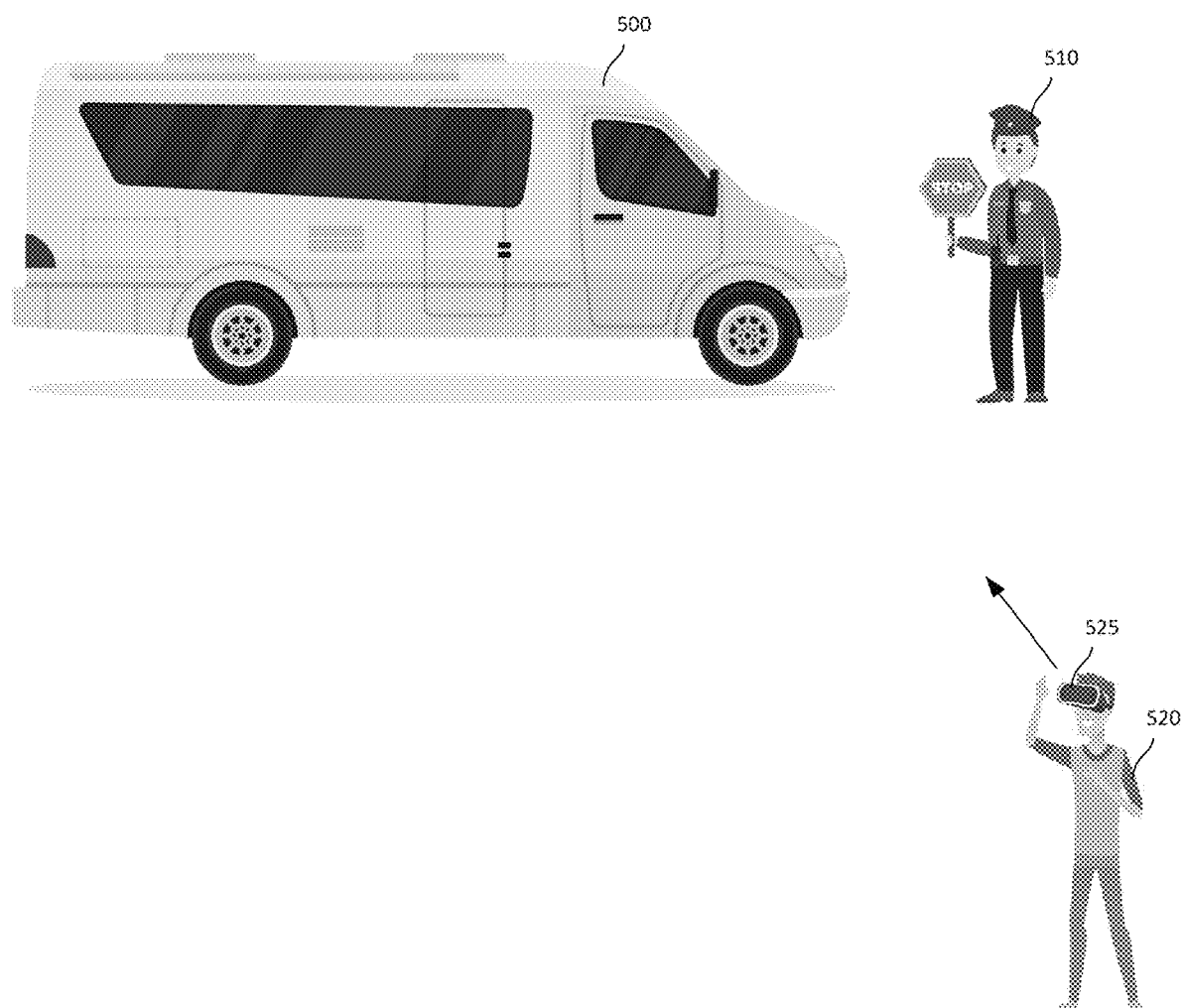
FIG. 22 is a side, elevation view of an existent vehicle and a virtual human police officer rendered to a non-occupant wearing an augmented reality headset.

An embodiment and application of the invention has utility for security applications. In FIG. 22, an existent vehicle 500 is observed by non-occupant 520 wearing augmented reality glasses 525. Sensors in vehicle 500 detect non-occupant 520's presence and spatial location relative to vehicle 500. Virtual human police office 510 is rendered to augmented reality glasses 525 conveying to non-occupant 520 that vehicle 500 detects surroundings. Furthermore, the configuration of the virtual human 510 in the occupation of a law enforcement officers conveys to non-occupant 520 that vehicle 500 has security monitoring features.

Figure 23:
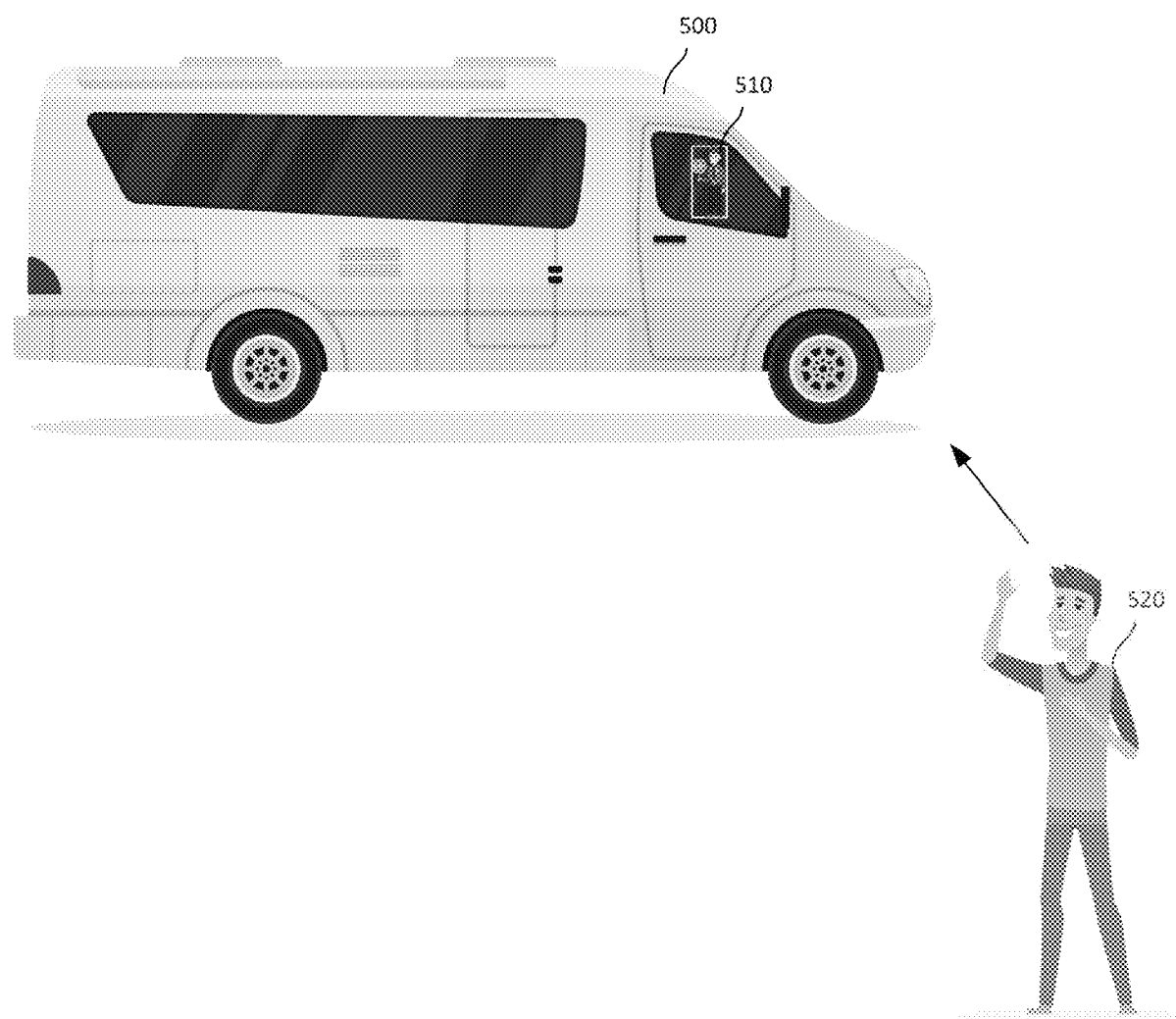
FIG. 23 is a side, elevation view of a virtual human police officer displayed on a passenger-side window of an existent vehicle, the virtual human observable by a non-occupant of the vehicle.
Figure 24:
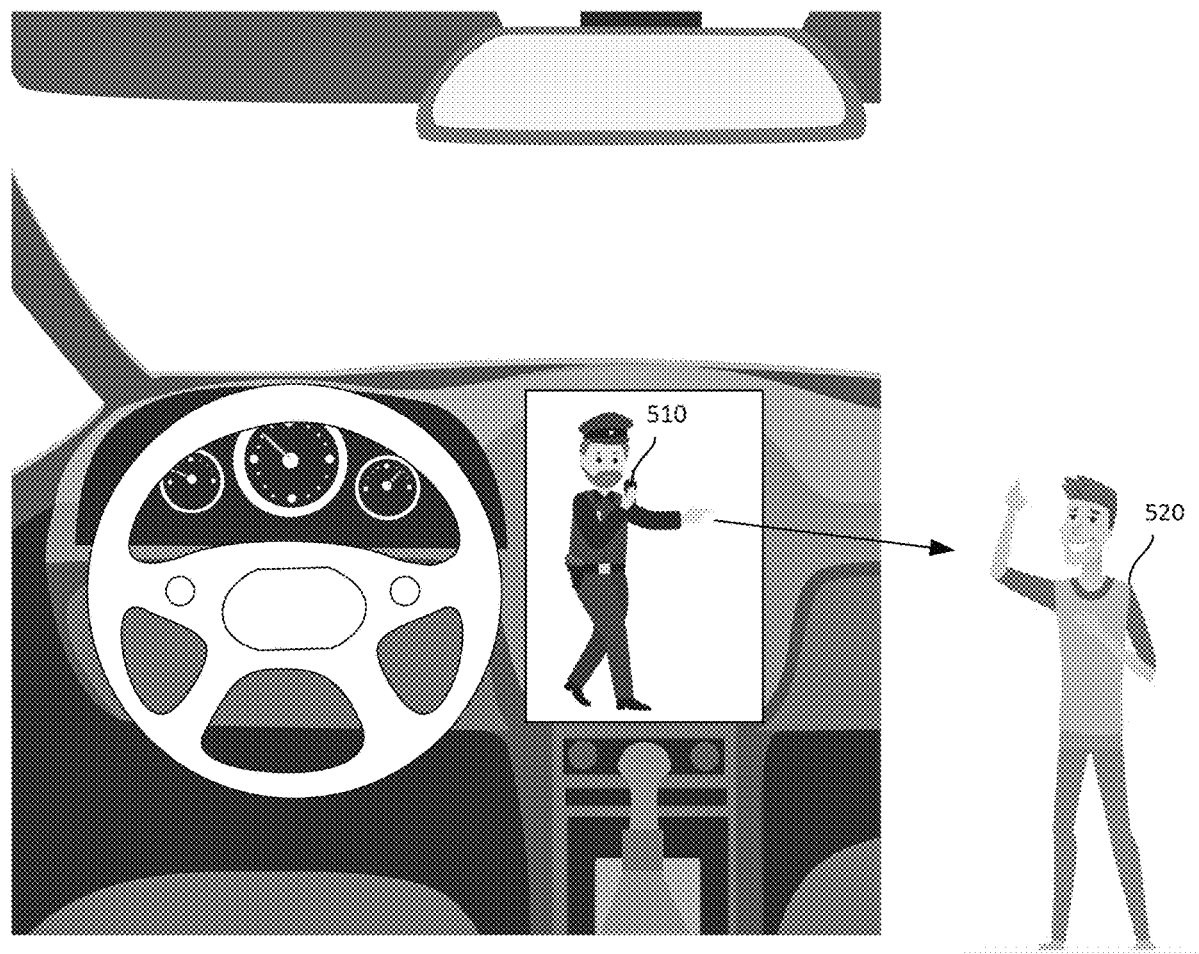
FIG. 24 is a front, elevated view of an existent vehicle dash with an integrated, two-dimensional display showing a virtual human police officer viewable to a non-occupant through the windows of the existent vehicle.

In an alternative embodiment shown in FIG. 23, non-occupant 520 does not have augmented reality glasses on, but virtual human 510 is projected onto vehicle 500. This projection may be through a heads-up display, an embedded OLED screen within the windows of vehicle 500, a top-down projection onto the vehicle windows or displays integral to the outside of vehicle. In yet another embodiment of the invention shown in FIG. 24, the non-occupant 520 leans in to view the interior of the vehicle and observes the virtual human police office 510 rendered on a 2-dimensional integrated dash display. As sensors in vehicle 500 detect the location of non-occupant, virtual human 510 is oriented to align the gaze and body of virtual human 510 in the direction of non-occupant 520. This conveys to non-occupant 520 that the vehicle 500 is aware of non-occupant's proximity and spatial position relative to vehicle 500. Additional embodiments may show the virtual human recording images in conjunction with integrated camera sensors in vehicle 500, sounding alarms, calling the vehicle owner and the like.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions, in fact, result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any non-transitory, tangible medium that can contain, or store a program for use by or in connection with an instruction execution system, apparatus, or device. Storage and services may be on-premise or remotely, such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a computer-readable storage medium, and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wireline, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA, and PERL.

For communications, particularly to non-occupants, a number of wireless communication protocols may be used. For example, vehicle-to-vehicle (V2V) communication enables vehicles to wirelessly exchange information about their speed, location, and heading. V2V communication allows vehicles to broadcast and receive omni-directional messages, creating a 360-degree "awareness" of other vehicles in proximity. Vehicles, pedestrians, traffic control systems, cyclists and others equipped with appropriate hardware and software use the messages from surrounding vehicles to determine navigational paths and hazards as they develop. The technology employs visual, tactile, and audible alerts—or, a combination of these alerts—to warn occupants and non-occupants outside the vehicle. While initially planned as an ad hoc network, connectivity infrastructure, redundancy and quality of service features permit centralized storage and processing. Alternatively, a hybrid environment of on-premise (vehicular ad hoc networks, VANETS) networks may be enhanced or supplemented by centralized system through protocols under the brands or designations BLUETOOTH, 3G, 4G, 5G, WIFI, satellite or other wireless modalities.

In yet another embodiment of the invention, the virtual human is a "companion" to a specific individual. An individual grants to companion access to the individual's calendar, electronic communications and the like. Accordingly, the companion's knowledge, appearance and settings roam with the individual. The companion is thus personalized to the individual. For example, where four individuals are all simultaneous occupants of a vehicle and wear personal display devices (e.g., MICROSOFT HOLOLENS equipment), unique companions appears to each individual but the companions all receive and interact with vehicular and external data to convey attentive observation and action in automated systems. In an embodiment, each additional individual with a personal display device sees the virtual human companions (whether common/shared or unique) from their individual personal perspectives. In other words, the view of the companion is configured for where they are sitting in the vehicle.

In yet another embodiment of the invention, multiple virtual humans coexisting in the rendered simulated environment. For example, one virtual human is rendered as a "driver" of a vehicle and a second virtual human is rendered as the vehicle "navigator" giving attention towards navigation or roadside hazards. The plurality of virtual humans may be made to interact with each other further enhancing the reality of the simulated rendering.

In yet another embodiment of the invention, a virtual human may be rendered in a first vehicle making motions (e.g., waving, nodding, gesturing, etc. . . . ) toward a second vehicle. These gestures may be communicatively isolated as each vehicle is operating automated systems independently. Alternatively, with V2V communications (or through a centralized, remote network point), the virtual human in the first vehicle is representing an automation or V2V decision to let the second vehicle merge ahead of it. Accordingly, virtual human rendering may be shared with individuals outside the immediate network or domain of the computer processor operating the virtual human.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Augmented Reality means technologies that superimposes a computer-generated image on a user's view of the real world, thus providing a composite view.

Avatar means an icon or figure representing a particular person in a computer simulation.

Black Box means any complex array of equipment, typically electronic, wherein the contents and controls are considered enigmatic to the user.

Engagement Set means parameter values in the situational data causing the visual and/or audible graphic rendering of a virtual human in gestures and movements that convey to an observing existent human that the autonomous control system is engaged in action that changes the previous autonomous control system conditions.

Observant Set means parameter values in the situational data causing visual and/or audible graphic rendering of a virtual human in gestures and movements that convey to an observing existent human that the autonomous control system is aware and cognitive of situational data likely to cause the autonomous control system to take imminent action or change the action it is currently taking.

Existent Human means a non-virtual, living human directly or indirectly subject to the trust-sensitive autonomous control system's performance.

Existent Vehicle means a non-virtual, real-world vehicle subject to an autonomous control system's operation.

Haptic means perception and manipulation of objects using the senses of touch and proprioception.

Head Mounted Display (HMD) is a digital display device worn on the head or integrated into a helmet. An HMD may present a completely virtual reality environment or may also reflect projected images wherein a user may see through it in augmented reality environments. Some commercially available HMDs include those sold under the brands OCULUS RIFT and MICROSOFT HOLOLENS.

Mixed Reality means the combination of virtual and real worlds to generate new environments and visualizations wherein physical and digital objects co-exist and interact in real-time.

Situational Data means sensor and control data the trust-sensitive autonomous control systems uses and/or generates in its control capacity.

Tactile means of or connected with the sense of touch.

UV mapping means the 3D modeling process of projecting a 2D image to a 3D model's surface for texture mapping.

Virtual Environment means the audio, visual, tactile, and other sensory features of a computer-generated simulation.

Virtual Human means a computer-generated, 2-dimensional, or 3-dimensional anthropomorphic character that conveys gestures, poses, interactions, and even audio consistent with a fully attentive, competent manual operator of a system that is otherwise autonomous or semi-autonomous with respect to an existent human observing the virtual human.

Virtual Reality means a computer-generated simulation of a three-dimensional image or environment that can be interacted with in a seemingly real or physical way by a person using special electronic equipment, such as a helmet with a screen inside or gloves fitted with sensors Virtual Retinal Display (VRD) means a display system that draws a raster display directly onto the retina of an eye. The recipient sees what appears to be a conventional display floating in space in front of them. This is also known as a retinal scan display (RSD) or retinal projector (RP).

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method of conveying to a vehicle non-occupant their spatial detection by a trust-sensitive autonomous vehicle control system operating the vehicle, a computer processor generating attentive gesture images through a vehicle-mounted display device viewable by the non-occupant, the method comprising the steps of: providing a computer comprising the computer processor accessing non-transitory computer-readable memory, the memory storing computer-readable instructions that, when executed by the processor, cause the processor to evaluate input data and logically modify the output of the display device in response; receiving, by one or more sensors communicatively coupled to the processor, relative location data of the non-occupant used by the trust-sensitive autonomous control system to make real-world automation decisions; and generating a plurality of attentive gesture images through the display device viewable to the non-occupant wherein the attentive gesture images change in response to the location of the non-occupant relative to the vehicle wherein the attentive gestures images are selected from the group consisting of head orientation, pupil orientation, limb orientation, and facial expression whereby the attentive gestures track the location of the non-occupant relative to the vehicle.

2. The method of claim 1, wherein the attentive gesture images include turning a head of a virtual human driver in the spatial direction of the non-occupant.

3. The method of claim 1, wherein the attentive gesture images include a graphically rendered virtual human driver actions include graphically rendered rotation of vehicle steering wheel.

4. The method of claim 1, wherein the attentive gesture images include a graphically rendered virtual human driver actions include graphically rendered vehicle pedal engagement.

5. The method of claim 1, wherein the attentive gesture images include a virtual human driver positionally rendered over the controls of the existent vehicle.

6. The method of claim 1, wherein the display is a two-dimensional, flat panel display integral to the vehicle.

7. The method of claim 1, wherein the display is a heads-up, projected display integral to the vehicle.

8. The method of claim 1, wherein the display is a transparent, organic light-emitting diode display integral to the vehicle.

9. The method of claim 1, wherein the attentive gesture images are displayed through an embedded organic light emitting diode screen within a window of the vehicle.

10. The method of claim 1, wherein the attentive gesture images are displayed through a heads-up display projected onto a window of the vehicle.

11. A computer-implemented method of conveying to a vehicle non-occupant their spatial detection by a trust-sensitive autonomous vehicle control system operating the vehicle, a computer processor generating attentive gesture images through an augmented reality display device worn by the non-occupant, the method comprising the steps of: providing a computer comprising the computer processor accessing non-transitory computer-readable memory, the memory storing computer-readable instructions that, when executed by the processor, cause the processor to evaluate input data and logically modify the output of the display device in response; receiving, by one or more sensors communicatively coupled to the processor, relative location data of the non-occupant used by the trust-sensitive autonomous control system to make real-world automation decisions; and generating a plurality of attentive gesture images and transmitting the images to the augmented reality headset wherein the attentive gesture images change in response to the location of the non-occupant relative to the vehicle and the attentive gestures track the location of the non-occupant relative to the vehicle.

12. The method of claim 11, wherein the attentive gesture images of the non-occupant's spatial location detected by the vehicle are presented through the non-occupant's augmented reality headset as an object external to the current spatial location of the vehicle.

13. The method of claim 12, wherein the object is an anthropomorphic form.

* * * * *